United States Patent [19]
Starkey

[11] Patent Number: 5,888,803
[45] Date of Patent: Mar. 30, 1999

[54] METHOD FOR THE PRODUCTION OF MUSHROOMS

[75] Inventor: Nicholas Grenville Starkey, Arsley, Denmark

[73] Assignee: Grodania A/S, Hedehusene, Denmark

[21] Appl. No.: 676,151

[22] PCT Filed: Apr. 26, 1996

[86] PCT No.: PCT/DK96/00191

§ 371 Date: Nov. 12, 1996

§ 102(e) Date: Nov. 12, 1996

[87] PCT Pub. No.: WO96/33602

PCT Pub. Date: Oct. 31, 1996

[30] Foreign Application Priority Data

Apr. 28, 1995 [DK] Denmark .................. 0508/95

[51] Int. Cl.⁶ ........................................ A01G 1/04
[52] U.S. Cl. .................... 435/254.1; 435/256.8; 47/1.1; 71/5
[58] Field of Search .............. 47/1.1; 71/5; 435/254.1, 435/256.8

[56] References Cited

U.S. PATENT DOCUMENTS

| | | | |
|---|---|---|---|
| 3,828,470 | 8/1974 | Stoller | 47/1.1 |
| 4,170,842 | 10/1979 | Stoller | 47/1.1 |
| 4,337,594 | 7/1982 | Hanacek et al. | 47/1.1 |
| 4,443,969 | 4/1984 | Hanacek et al. | 47/1.1 |
| 5,503,647 | 4/1996 | Dahlberg et al. | 47/1.1 |
| 5,514,191 | 5/1996 | Miller et al. | 47/1.1 |

FOREIGN PATENT DOCUMENTS

| | | |
|---|---|---|
| 0284421 | 9/1988 | European Pat. Off. . |
| 1124327 | 5/1989 | Japan . |
| 03123417 | 5/1991 | Japan . |
| 8905574 | 2/1989 | WIPO . |
| 96/04777 | 2/1996 | WIPO . |
| 96/05720 | 2/1996 | WIPO . |

OTHER PUBLICATIONS

Proceedings of the 5th International Congress on Soilless Culture, 18 May 1980, Wageningen (NL) pp. 395–410, Visscher et al. 'Substitutes for peat in mushroom casing soil' cited in the application, see whole document.

*Primary Examiner*—Leon B. Lankford, Jr.
*Assistant Examiner*—Christopher R. Tate
*Attorney, Agent, or Firm*—Merchant, Gould, Smith, Edell, Welter & Schmidt

[57] ABSTRACT

The invention relates to a method for producing fungi, especially mushrooms, using a casing material comprising granules and/or agglomerates of granules of a mineral fibre structure, and to a casing material notably for the use in the production of fungi as well as a method for the preparation of a casing material. The invention furthermore relates to a casing spawn used for the inoculation of a casing material.

The mineral fibres may be stone wool fibres, glass wool fibres, slag wool fibres, naturally occurring mineral fibre materials such as wollastonite and the like. The casing material may contain a binding agent, a nutrient source, a mineral source, a wetting agent, a pH-adjusting agent, a liming material, a fertilizer, a chelating agent and/or other excipients.

The casing material for use according to the invention establishes favorable and lasting physical conditions for the growth of the mycelia of the fungi manifested by a longer cropping period as well as a higher yield and a better quality of fruiting bodies harvested, compared to the traditional method of growing fungi using casing materials based on peat.

55 Claims, 1 Drawing Sheet

METHOD FOR THE PRODUCTION OF MUSHROOMS

FIELD OF INVENTION

The present invention relates to a method for producing fungi wherein the formation of fruiting bodies is performed from a casing material arranged on a solid nutritive medium for the fungi.

The invention also relates to a casing material for the use in the production of fungi.

The present invention furthermore relates to a casing material formulation comprising fungal mycelium used for the inoculation of a casing material.

Moreover, the present invention relates to a method for the preparation of a casing material.

BACKGROUND OF THE INVENTION

Traditionally, the production of fungi such as mushrooms proceeds in a series of steps as follows:

- providing a preparation of a solid nutritive medium (compost);
- optionally pasteurisation of the nutritive medium;
- inoculating the optionally pasteurized nutritive medium with fungal mycelia (spawn);
- arranging the inoculated nutritive medium in a growing environment;
- applying a substantially continuous layer of a casing material on the inoculated nutritive medium;
- allowing a colonization of the substantially continuous layer of the casing material with the mycelium of fungi;
- allowing the mycelium to form primordia of fruiting bodies and subsequently fruiting bodies from the substantially continuous layer of casing material;
- harvesting fruiting bodies of the fungi from the substantially continuous layer of casing material.

The casing material will establish the conditions necessary for the growth of mycelia, and will support the formation of fruiting bodies of fungi, without a casing material. The formation of fruiting bodies has up to now been considered impossible.

Casing materials used in a traditional production lay-out of fungi, such as mushrooms, are normally based on peat.

Peat is not considered being a sterile material, and may, like any natural organic material consisting mainly of partly decomposed organic material such as sphagnum moss, contain pathogens harmful to the crop of fungi such as Trichoderma sp.

Peat has a natural low pH which must, in order to reduce the risk of attack of pathogens harmful to fungi, be increased to a pH of 7 or above by mixing a liming material into the peat casing. Being a natural organic material and due to the need of mechanical handling, the structure of peat will tend to break down and collapse in use, and as a result hereof the pore space within the peat casing material available for mycelial growth and/or water will be reduced. Moreover, as a result of a structural disintegration, water logged conditions will be established in the peat casing. This will lead to a poor gas exchange to and from the peat casing which in turn will lead to a reduced formation of fruiting bodies and thereby to financial losses for the grower.

Normally, very large quantities of peat, over 100,000 m$^3$ per year in e.g. the United Kingdom alone, is used for the preparation of casing material in the production of fungi, and because peat is one of nature's resources it is likely that sources of peat (peat bogs) will be depleted or that availability will be restricted due to the legislation protecting the sites where peat is excavated.

Some attempts have been made to optimize the production of fungi using materials as casing layer that could reduce one or more of the above mentioned identified problems associated with the use of peat as a casing material as well as reduce the amount of a casing material used in the production of fungi.

Furthermore, there is an increasing need for the development of improved methods for growing fungi involving the application of alternative casing materials on a solid nutritive medium. Such casing materials having improved characteristics over known casing materials thereby being able e.g. to obtain a better yield and/or quality of produce.

Surprisingly, the present inventor has found that it is possible to establish mycelial colonization, pinning of fruiting bodies of mushrooms and subsequent formation of fruiting bodies in a casing material comprising granules or agglomerates of a mineral fibre structure arranged on a solid nutritive medium.

The following provides a review of the literature relating to the production of fungi and disclosing compositions containing mineral fibres used in the production of fungi.

Kokai (Japanese Patent Publication) No. 3-123417 discloses the use of a culture medium of "stone wool" (mineral fibres) having capillary action, immersed in a culture solution. Cultivation is conducted on the culture medium to fruit body of mushroom. It is stated that the liquid medium contains glucose, polypeptone, yeast extract, mono potassium phosphate, magnesium sulphate, calcium chloride, and trace amounts of other elements and water.

When the level of nutrients is lowered by the consumption of the mycelia, it is replaced by adding fresh culture solution to the culture medium.

However, this method is performed in an artificial environment, all organic nutritional matter being supplied via a liquid.

WO 89/05574 defines a casing material as a material which supports mushroom fruiting and a non-casing material as a material which will not support mushroom fruiting. According to the disclosure in WO 89/05574 "stone wool", in the form of a pad, had been inoculated with mushroom spawn and supplied with a nutrient source, but no colonization of the pad had been obtained. The "stone wool" tested is therefore a non-casing material which is used as a layer isolating the compost layer from the surrounding environment.

U.S. Pat. No. 4,170,842 describes a synthetic casing for mushroom beds provided by a formulation consisting of a water absorptive material selected from paper plant waste, spent mushroom compost and cotton seed hulls. The water absorptive material has been mixed with activated carbon, water and lime stone. The paper plant waste is said to be an example of a fibrous material which has little or no value and which may replace the costly peat as a casing material.

EP 0 284 421 discloses a synthetic substrate for the support of the growth and development of filamentous fungi. The substrate is comprised of a nutrient in a hydrated hydrogel matrix forming a capsule. In a preferred embodiment, the capsule is said to have an irregular external surface to allow filamentous fungi to adhere thereto.

H. R. Visscher in *Proceedings of the 5th international congress on soilless culture*, Wageningen 18–24 May 1980, pages 395–410, discloses a casing material based on limecakes, which is a clayey byproduct of sugar extraction from sugar beets, obtained as a CaCO$_3$ precipitate, after clearing the hot sugar sap, and strained off as a slurry and afterwards pressed or weathered in the open in large basins. It is stated that studies had revealed that the lime-cakes must be a year old, turned and weathered; otherwise yield reduction will occur. To the lime-cake based casing material granulated "stone wool" has been added in amounts of 25 and 50% by volume, and tested as a casing material. However, it is stated that the yield obtained in such casing materials could not supersede yield obtained from peat.

DISCLOSURE OF THE INVENTION

The invention relates to a method for producing fungi, wherein the formation of fruiting bodies of the fungi is performed from a casing material arranged on a solid nutritive medium for the fungi, the casing material comprising granules, and/or agglomerates of granules, of a mineral fibre structure, the granules or agglomerates of the casing material having a bulk water capacity of at least 300 grammes per 100 grammes dry weight of the granules or agglomerates, determined at a suction pressure of 10 cm on a calibrated sand bed, and the casing material having a water retaining capacity, determined at a suction pressure of 100 cm on a calibrated sand bed, of at the most 15% by volume of the casing material.

In the present context, the term granules designates random arrangements of mineral fibres into substantially free-flowing particles or bodies of a rounded shape.

The term agglomerates designates bodies the appearance of which corresponds to two or more granules kept together, such as by mutual infiltration of the fibres therein.

The casing material may further contain at least one additional component which may be distributed throughout the casing material.

In the present context the term additional component designates components such as e.g. nutrient sources for the fungi, binding agents, mineral sources for the fungi, wetting agents, liming materials, pH-adjusting agents, fertilizers, chelating agents, oily agents such as mineral or vegetable oil, dyes or colouring agents and the like, and combinations thereof; as well as compounds such as vitamins and amino acids, micro organisms such as bacteria and/or mycelia of at least one fungus and the like, and combinations thereof.

In the present context the casing material, with or without additional components, is used as arranged on any domain or area that substantially constitutes the top surface of a solid nutritive medium.

Also in the present context, the casing material, with or without additional components, may be arranged to cover from such as 1, 10, 20, 30, 40, 50, 60, 70, 80, 90 or even above 99%, of the area substantially constituting the top surface of a solid nutritive medium, or discrete and/or predefined parts of a solid nutritive medium, or to cover a solid nutritive medium in a manner that is considered especially suited to the growth habits of fungi, the lay out of the growing system or suited to any combination possible from the above mentioned.

The method according to the present invention using a casing material of granules or agglomerates of a mineral fibre structure is possible because a very favourable environment, manifested by the unique combination of a high water capacity and a low water retaining capacity, for the growth of mycelia is established.

The granules or agglomerates will when arranged on a solid nutritive medium form a porous and open layer wherein the pore size of the granules or agglomerates of a mineral fibre structure will be in the range from about 0.5 $\mu$m to about 100 $\mu$m with a major part of the pores in the range from about 5 $\mu$m to about 50 $\mu$m.

The voids established between the granules or agglomerates, when the casing material is arranged as a layer on a solid nutritive medium, will typically be shaped so that the diameter or cross section will be from about 0.2 mm to about 20 mm.

The porous and open character of both the layer of the granules or agglomerates and the granules or agglomerates per se will allow growth of the mycelial filaments not only on the surface of the granules or agglomerates but also within the free space contained within the granules or agglomerates and between the granules or agglomerates.

Moreover, as a result of the favourable conditions established, the mycelia will tend to penetrate the entire mass of the mineral fibre structure of the granules or agglomerates and thereby add to the general stability of the casing material.

This growth pattern of the mycelia occurs because of the relative high possible water content in the casing material of the granules or agglomerates, and due to the fact that essentially all of the water contained within the granules or agglomerates of a mineral fibre structure is loosely held therein, making substantially all of the water easily available to the growth of the mycelium.

The granules or agglomerates of mineral fibre structures without any additional elements present should have a bulk water capacity of at least 300 grammes, such as e.g. 350 grammes, or even as much as 375 grammes of the dry weight of the casing material, determined at 10 cm suction pressure on a calibrated sand bed.

The bulk water capacity is the actual amount of water that on a dry weight basis will be contained in the casing material determined after a suction pressure of 10 cm water column has been applied to the casing material, according to the test method described by R. Gabriels and O. Verdonck in Acta Horticulturae Vol. 294, 1991, pages 249–259.

Other test methods and/or relevant substitutes for the materials used in the present or in any other test method may be applied as long as data obtained from the test(s) can be reproduced and relevantly express the features of the materials tested.

In order to obtain reliable values for bulk water capacity, it is necessary to base the test on a representative sample of at least 10 liters of granules or agglomerates of a mineral fibre structure intended for use as a casing material.

This amount of granules or agglomerates must be completely saturated with water for 24 hours, then drained by applying 50 cm suction pressure for another 24 hours and then, from here, at least 4 sub-samples of 400 to 500 ml of the granules or agglomerates are prepared in special containers. These containers are soaked for 24 hours, and afterwards transferred onto a calibrated sand bed. The calibrated sand bed is filled with a silica flour type M2, and is adjusted to a suction pressure of 10 cm water column.

The silica flour type M2 is characterized by a sieve analysis where, on an average basis, the particles have the following size distribution:

| Sieve analysis for silica flour type M2 | |
| --- | --- |
| Microns | % |
| 250 | 5 |
| 200 | 5 |
| 160 | 10 |
| 100 | 22 |
| 63 | 18 |
| 40 | 10 |
| 20 | 16 |
| 10 | 7 |
| 4 | 5 |
| 2 | 1.5 |
| <2 | 0.5 |

The four sub-samples are placed on the sand bed and allowed to drain for at least 48 hours.

After draining of the samples of granules or agglomerates the wet weight of the samples is determined, and after drying of the samples at 105° C. until constant weight, the dry weight of the samples is determined. The difference between the wet weight and the dry weight, per 100 grammes of dry weight of granules or agglomerates, is the value of bulk water capacity at 10 cm suction pressure.

The bulk water capacity at 10 cm suction pressure is one of the important parameters that can be linked to the performance of a casing material of granulate or agglomerates of granulates, but for a more complete understanding of the advantages this parameter should be seen in combination with the parameter for the water retaining capacity or ability.

The water retaining capacity, as determined at 100 cm suction pressure, is used as a measure for the casing material's ability to release water or solution, and thereby indirectly to reveal whether the material for the casing material has a pore size distribution that, in this context, will be suitable for mycelial growth.

If the water contained within the casing material is to be made easily available to the mycelia, it is important that the granules or agglomerates of a mineral fibre structure, with the additional component or components, have a water retaining capacity determined at a suction pressure of 100 cm on a calibrated sand bed, which is at the most 15% such as, e.g., 7,5%, or even as low as 5% by volume of the casing material.

A sample of at least 10 liters of granules or agglomerates of granules of a mineral fibre structure, with the optional additional component or components, must be prepared for the determination of the water retaining capacity of the casing material.

The sample is completely saturated with water for 24 hours, drained by applying 50 cm suction pressure for another 24 hours and, from here, at least 4 sub-samples of 400 to 500 ml of structure are prepared in special containers. These containers are soaked for 24 hours, and afterwards transferred onto a calibrated sand bed. The calibrated sand bed is filled with a silica flour type M2, as defined above, and is adjusted to a suction pressure of 100 cm water column. The 4 sub-samples are placed on the sand bed and allowed to drain for at least 48 hours.

After the draining of the samples at 100 cm suction, the wet weight of the samples is determined, and after drying of the samples at 105° C. until constant weight the dry weight of the samples is determined.

The difference between the wet weight at 100 cm suction and the dry weight in grammes at 100 cm suction is divided by the volume of the sample and multiplied by 100 (%), hereby obtaining the water retaining capacity of the casing material.

In the present context, a casing material having the properties that match any combination of the ranges of the stated bulk water capacity and water retaining capacity, e.g. such as a casing material having a bulk water capacity of 350 grammes per 100 grammes of dry weight of granules or agglomerates and a water retaining capacity of 15% by the volume of the casing material, is advantageous for use in production of fungi.

As stated above, the granules or agglomerates of a mineral fibre structure, with the additional component or components, should have a water retaining capacity determined at a suction pressure of 100 cm on a calibrated sand bed, which is at the most 15% by volume of the casing material.

If the water retaining capacity exceeds, e.g. 20% by volume of the casing material determined at a suction pressure of 100 cm, there is a risk that the water in the casing material is held too strongly in the fine pores of the structure of the casing or that, if present, the optional additional component or components will bind the water either chemically or by other bonds that make the water more difficult for the mycelia to utilize, which will in turn make the irrigation of the casing difficult to control as the actual amount of water in the casing material is unknown.

Apart from the important issue that the water should be loosely held in the casing material, it is also important that the water contained therein has a low nutrient content compared to the content in the solid compost layer.

The granules or agglomerates of a mineral fibre structure, the mineral fibres per se do not add any nutrients, and, if any at all, the amount of nutrients being added is considered insufficient to support the growth of the fungi.

Hence, the difference in osmotic pressure between the water held in the porous structure of the granules or agglomerates and the water held in the solid compost layer, rich in nutrients, will, if the casing material is in contact with the solid compost layer, cause a flow of elements and substances, such as iron, magnesium and organic compounds, such as vitamins, and even micro organisms, such as bacteria, from the solid compost layer into the casing material at a slow and steady rate until a steady state situation is reached.

This flow is believed to supply the mycelia with nutrients and the nutrients will furthermore, due to the high water capacity and water content in the casing material of granules or agglomerates, be diluted to a level that supports and even enhances the formation of fruiting bodies.

As it will be shown in the examples, the fact that the water is loosely held in the casing material of granules or agglomerates of a mineral fibre structure causes a reduced demand for exchange of the solution in the casing material, an exchange, which is normally performed when the casing material is irrigated, and which, if needed, can be performed with less water.

This will typically require less input of labour, and the fruiting bodies formed may have a higher dry matter content, a fact which will have a beneficial effect on taste and post-harvest quality of the fungi such as mushrooms.

Moreover, the slightly alkaline reaction of mineral fibres which is normally above pH 7 (on a 1+1 volume to volume basis with water), typically above pH 7.5, will provide a favourable environment further supporting the establishment and growth of the mycelia within the porous granules of a mineral fibre structure and substantially eliminating the risk for development of any diseases that are detrimental at low pH levels. The clean environment established by the use of mineral fibres will further reduce the risk of development of diseases in the casing material. The mineral fibres are substantially clean and sterile due to the high temperature needed for the manufacturing of mineral fibres, the temperature typically being above 1000° C.

As apparent from the examples, the alkaline reaction of mineral fibres substantially eliminates the need for addition of any pH-adjusting material to the casing material of granules or agglomerates which in turn will reduce the need for a long mixing process that could cause irreversible damage to the structure of the material of granules or agglomerates.

Likewise, the costs involved and the time spent for addition of a liming material, such as calcium carbonate, chalk, dolomitic limestone or calcium sulphate or the like, and combinations thereof, will be avoided.

As shown in the examples, the additional component or components is/are typically distributed in the casing material either as a nutrient source for the fungi and/or as a mineral source for the fungi.

For a good support of the growth of fungi and in order to have a good distribution of the additional component or components, it is ideal if at least a part of the additional component or components is/are contained in the granules or agglomerates of the casing material.

In some cases, at least a part of the additional component or components may be deposited on the granules or agglomerates of granules, and/or at least a part of the additional component or components may be adhered to the surface of the mineral fibres e.g. by supplying the additional component or components together with a binding agent and/or coating the mineral fibres with at least one additional component or combinations thereof.

Normally, the additional component or components present is/are distributed in the casing material as solid particles having a mean particle size from about 0.01 mm to about 10 mm.

Within this range of mean particle size of the component or components, certain relevant specific particle sizes or intervals of particle sizes may exist, such as, e.g., relatively small particles of 0.15 mm or relatively large particles of about 5 mm or an interval from 0.5 to 3 mm, depending on the type of component or components chosen and the species or strain of fungi to be grown.

As indicated above, an open and porous casing material is favoured. This is obtained when a major part of the casing material is in the form of granules or agglomerates of granules.

When 60% of the volume of the casing material is in the form of granules or agglomerates of granules of a mineral fibre structure, a sufficient pore space and voids for the growth of the mycelia of most fungi is normally established.

However, in some cases a larger proportion of granules or agglomerates, e.g. if at least 70% of the volume of the casing material is in the form of granules or agglomerates of granules, the conditions in the casing material established thereby allows a better distribution of the mycelium throughout a larger proportion of the casing material, and as a result thereof, the speed of colonization and establishment will be higher. Under certain circumstances it is ideal if at least 75% of the volume of the casing material is in the form of granules or agglomerates of granules.

In some cases, however, and not necessarily related to the situations stated in the above, at least 90,95 or even 99% of the volume of the casing material is in the form of granules or agglomerates.

The surface area of the mineral fibre material chosen for the granules or agglomerates of the casing material may be adapted to suit the particular depth of the casing material that is used in the production of fruiting bodies of fungi.

The surface area of the mineral fibre material, such as the surface area of the mineral fibres in the structure of granules or agglomerates, is a function of the bulk density of the mineral material used in the production of mineral fibres, the density of the final product, the mean fibre diameter of the mineral fibres used to establish the granules or agglomerates as determined by a measurement technique that involves a scanning electron microscope or a particle analyzer, and of the content of non-fibrous matter ("shot") associated with the mineral fibre material and which has its origin from the manufacturing of the mineral fibres. "Shots" are normally defined as non-fibrous mineral material having an aspect ratio less than 5, the aspect ratio being a length over diameter ratio. Normally, the mean length of the mineral fibres is from about 1 pm to about 5,000 pm.

In the present context, the amount of the non-fibrous material ("shot") in the granules or agglomerates of a mineral fibre structure constitutes from about 1 to about 50% of the total weight of the granules or agglomerates of a mineral fibre structure, typically below 10% for a glass wool fibre based material and typically from 10 to 40% for a stone wool or slag wool fibre based material.

The mean fibre diameter, as determined using any one of the techniques involving the above mentioned types of equipment, of the mineral fibres in the granules or agglomerates will in most cases be in the range from 1 to 20 $\mu$m, but will typically be in the range from 2 to 8 $\mu$m, and mineral fibres having a diameter between 3 and 5 $\mu$m are especially suitable.

The specific bulk density of the mineral material used in the production of the mineral fibres is between 2,500 and 3,000 g×1$^{-1}$, typically from about 2,600 g×1$^{-1}$ to about 2,800 g×1$^{-1}$.

A casing material of granules or agglomerates of a mineral fibre structure will normally have a density between 25 and 500 g×1$^{-1}$ of casing material, such as 50 to 400 g×1$^{-1}$ of casing material, the density determined based on a sample of at least 10 liters of casing material of granules or agglomerates.

As shown in the examples, a casing material of granules or agglomerates having a density between 100 and 350 g×1$^{-1}$ is considered to be especially suitable for the production of fungi such as edible fungi such as mushrooms.

As an example, if the bulk density of mineral fibres is 2,650 kg×m$^{-3}$, the fibre diameter is 5 $\mu$m, and the content of "shot" (non-fibrous material) constitutes 30% of the total mineral fibre material in a casing material of a density of 200 kg×m$^{-3}$, the surface area of the mineral fibres in the casing material can be calculated to be approximately 42,264 m$^2$×m$^{-3}$ of casing material of granules or agglomerates.

The calculation is based on the following formulas:

$$\frac{\frac{d_1 \times (100 - s\%)}{d_2}}{\pi \times r^2} = l \qquad \text{i)}$$

and $$a = 2\pi \times r \times l \qquad \text{ii)}$$

where $d_1$ is the density of the mineral fibre material in the casing material in kg×m$^{-3}$, $d_2$ is the bulk density of the mineral fibre material in kg×m$^{-3}$, s is the weight percentage of "shot" in the mineral fibre material, r is the mean radius of the mineral fibres in meters, l is the calculated length of the mineral fibres in meters.

In relation to formula ii) l is to be regarded as the height of a cylinder having a mean radius of r, and which may be used in the calculation of a which is the resulting surface area of the mineral fibres expressed as $m^2 \times m^{-3}$ of the casing material.

Although it is possible to calculate the surface area of the mineral fibres in the structure of granules or agglomerates based on the above parameters the use of techniques or methods for the determination of the surface area of fibrous or particulate materials involving e.g. gas permeability methods, SEM or particle analyzers or the like may be applied.

It should be noted that there may be found discrepancies between the values obtained from the theoretical calculation of a surface area and the values obtained using any feasible technique or method for determination of surface area, which is typically due to the nature of the materials tested, i.e structure, shape or fibre orientation within the structures, and the like.

In case of any relevant discrepancy between the results from the theoretical and calculated method of determination of surface area and the results obtained from using any of the measurement techniques, the results have to undergo a further comparison and analysis in order to establish if and how a correction factor for the calculated method should be applied.

Mineral fibres within this context comprise slag wool fibres, glass wool fibres, stone wool fibres, naturally occurring mineral fibre materials such as wollastonite and the like, and combinations thereof.

Normally, the surface area of the mineral fibres in the structure of granules or agglomerates is in a range of from about 7,500 to about 100,000 $m^2$ per cubic meter of the casing material of granules or agglomerates.

For one type of the casing material of granules or agglomerates of a mineral fibre structure, particularly suitable for use in a shallow depth such as a depth of up to 10 mm, typically about 5 mm, the mineral fibres will preferably have a surface area in the range of from about 7,500 to about 20,000 $m^2$ per cubic meter of the casing material of granules or agglomerates.

This surface area will tend to provide the conditions whereby the concentration of water in the casing material typically is in the range from about 35 to about 70% by volume of the casing material determined at a suction pressure of 10 cm water column, still leaving ample pore space for the mycelium to grow through the entire depth of the casing material ensuring a proper colonization and subsequent formation of fruiting bodies from the casing material of granules or agglomerates.

The concentration of water determined as a percentage of the volume of the casing material at a suction pressure of 10 cm water column will normally indicate the concentration of water in the casing material when arranged on a solid nutritive medium.

When the surface area of the mineral fibres is in the range of from above about 20,000 to about 50,000 $m^2$ per cubic meter of the casing material of granules or agglomerates, the casing material of granules or agglomerates will retain a larger proportion of water at an identical suction pressure of 10 cm water column, and a structure having a surface area within this range will be considered suitable for use in layers having a depth between above 10 and below 80 mm, typically from about 15 to about 40 mm.

If the casing material is to be arranged on a solid nutritive medium in a depth from above 80 mm and up to a depth of about 250 mm, and if the granules or agglomerates are to retain substantially an identical amount of water per unit volume as indicated above, it is preferred that the mineral fibres have a surface area in the range of from about above 50,000 to about 100,000 $m^2$ per cubic meter of casing material of granules or agglomerates.

In a casing material, the mycelia should ideally, during its colonization of the casing material, penetrate through substantially the entire structure of the casing material, as this will establish the foundation for an even and stable pinning without causing an unnecessary exhaustion of the crop.

This is possible if the casing material of granules or agglomerates arranged on a solid nutritive medium is open and porous having voids or cavities between the granules or agglomerates and free space within the individual granules that will allow the mycelia to grow substantially unobstructed in any direction more or less independent of the organization of the granules or agglomerates within the casing material.

Normally, at least 50% on a volume basis of the granules have a size from about 1 to about 50 mm. However, in particular, if a more uniform distribution of the mycelia of more weak growing strains or species is to be established it is preferred that at least 60% on a volume basis of the granules have a size from about 2 to about 30 mm. However, most preferred is when 70% of the granules have a size from about 5 to about 20 mm.

In an other preferred embodiment at least 50%, such as at least 60% or at least 70% by volume of the granules have a size of at the most about 40 mm, such as at the most about 30 mm, or such as at the most about 7 mm.

As demonstrated in the examples, the assessment of the size and the size distribution of the granules is made by sieving a certain amount of granules, e.g. based on volume, over a series of different screens having suitable mesh sizes. The volume of granules that falls through each separate screen is correlated to the volume of the entire sample of granules in test, and a ranking of the size of granules as well as size distribution of the granules is possible.

As indicated above, it is important that an open and porous casing material structure of granules or agglomerates is established.

Even if it is possible to use a casing material of granules or agglomerates of a mineral fibre structure wherein the mineral fibres per se establish the structure, it is feasible to ensure that the open and porous structure of the casing material is maintained substantially as when first arranged on a solid nutritive medium using a binding agent that chemically binds or loosely fix individual mineral fibres, constituting the granules or agglomerates, together.

When a binding agent is used as an additional component, it is possible to reduce the bulk density of each granule because a lower amount of individual mineral fibres will be required to stabilize and support the structure and overall size of the body of each individual granule. Thereby, the basis for an increase of the overall porosity of the casing material of granules or agglomerates using less mineral fibre material is established.

The binding agent will normally be present in the granules or agglomerates of granules of the mineral fibres in a concentration from about 0.5 to about 10% on a weight to weight basis, depending on the type of binding agent chosen and the amount of fibres contained in the granules; effective binding agents like phenol formaldehyde resins will typically be present in a concentration from about 1,5 to about 3%, whereas inorganic binding agents or less effective organic binding agents typically will present in a concentration from about 4 to about 8% on a weight to weight basis.

It is preferred that the binding agent is an effective one which is present in the granules or agglomerates in a concentration which is from about 1.0 to about 5% on a weight to weight basis.

The weight percent of an organic binding agent in the granules or agglomerates can be determined based on the weight loss of a sample of granules or agglomerates achieved after 24 hours at approximately 600° C. related to the entire weight of the sample granules or agglomerates.

The binding agent may be selected from the group consisting of organic polymeric materials and resins such as phenol formaldehyde resins, melamine, polyethylene, polypropylene based polymers or modified acrylic polymers and the like, and combinations thereof.

As indicated above, the slightly alkaline reaction of the mineral fibres will establish a favourable pH level in a casing material of granules or agglomerates. This effect may be enhanced by using a binding agent that in itself has an alkaline reaction, such as aluminium phosphate type binding agent or silicon type binding agents such as water glass.

Alkaline binding agents are of special importance, if e.g. the strain of fungi grown has specific requirements to a certain constant pH level such as an interval from 7.4 to 7.8, or if the water used for irrigation of the casing material has a low bicarbonate content (low buffering capacity) e.g. below 100 ppm of bicarbonate.

Binding agents may further serve, either partly or entirely, as a nutrient source.

Binding materials serving the purpose of a nutrient source, partly or in their entirety, may be selected from binding agents that include starch- and methyl cellose-based binding agents, gelatine or pectin based binding agents and the like, and combinations thereof.

In general, all binding agents having a high content of carbon and a low content of nitrogen available to fungi can be considered as nutrient sources, either used on their own or in combinations with other binding agents.

As indicated above at least one additional component may be distributed in the casing material of granules or agglomerates.

It is important that the bulk volume of the additional component or components added, typically as solid particles, to the casing material does not obstruct the free space, actual pores and voids, established by the granules or agglomerates of granules so that the characteristic water holding and water retaining properties of the casing material of granules or agglomerates of a mineral fibre structure are changed in such a way that water logged conditions will be created.

Consequently, the additional component or components will typically have a density that is relatively high and above the density of casing material of granules or agglomerates of a mineral fibre structure without any additional component or components added.

Normally, this is established if the density of the additional component or components has/have a density of at least 500 $g \times l^{-1}$.

Normally, if present, the nutrient source is distributed in the casing material of granules or agglomerates in an amount from about 5 to about 70% by the dry weight of the casing material.

In some cases, the nutrient source is present in an amount from about 10 to 60% by the dry weight of the casing material. Whilst this range is considered relevant, there may be specific amounts of nutrients such as e.g. about 18 or about 31% by dry weight of the casing material that will be especially suited for a certain strain or species of fungi or ideal due to the nature and origin of the nutrient source selected.

Normally, the colonization of the mycelia in the casing material should be established in the shortest possible time and without exhausting the mycelia, and it is preferred that at least a part of the applied nutrient source is contained within the granules or agglomerates in the casing material. Thereby, and as shown in the examples, the fungal colonization of the casing, at least for certain strains or species, will take place substantially without the need for inoculation of the casing material with a casing spawn, which in turn will save labour input and costs when preparing a crop of fungi such as mushrooms.

When a nutrient source is present in the casing material of granules or agglomerates as an additional component, it contains nutrients such as carbon that will be available to the fungi in the production of fruiting bodies. However, the amount and type of nutrients added via the nutrient source, should not lead to excessive pinning (overgrowth) and formation of too many fruiting bodies that may lead to the production of mushrooms of a poor quality or a complete stop of growth.

Without being limited to any specific nutrient source suitable materials or combinations of materials that are known to support the growth of fungi include i) plant material such as seeds or grains or byproducts from the processing of such seeds or grains such as rice chaff or flour and the like or combinations thereof, ii) materials proteinaceous in nature such as casein, ceratin, gelatin, egg albumin and the like, and combinations thereof, iii) specific formulations comprising those prepared from e.g. casein, casein hydrolysates, peptones and the like, and combinations thereof; various mono-, di-, oligo- and polysaccharides such as sucrose, starch and the like, and combinations thereof, iv) fermented and/or decomposed and/or otherwise prepared, e.g. pasteurized, plant or moss material such as sedge based peat, sphagnum based peat and the like, and combinations thereof.

The nutrient sources may also further comprise vitamins and trace mineral sources and micro organisms such as bacteria and the like, and combinations thereof; at least one fungicide or at least one biocide and the like, and combinations thereof that is/are considered effective against pathogens of fungi.

The nutrient source chosen should have a relatively high content of carbon, at least 30% on a dry, ash free weight basis, whilst the content of nitrogen is relatively low, below 3%, on a dry, ash free basis.

As nutrient sources, slowly fermented, decomposed and even partly mineralized plant and/or other organic material and the like, and combinations thereof are preferred as these generally contain high amounts of carbon and low amounts of nitrogen available to fungi and as their origin will make them substantially free from any pathogens harmful to fungi, making them ideal to combine with the clean and substantially inert mineral fibres.

As a nutrient source, lignite, a naturally occurring organic material originating from decomposed plant material, is especially suited. In the present context, the term "lignite" is defined in accordance with the German term "Weichbraunkohle" which encompasses both "Scheifrige Weichbraunkohle" and "Erdige Weichbraunkohle" as disclosed in *Technologie der Brennstoffe* by Müller, W. J. and Graf, E., Frank Deuticke 1939. Xylite is another term for "Weichbraunkohle". Soft brown coal ("Weichbraunkohle") can be divided into:

A. Slaty soft brown coal with a slaty fracture, non-staining and almost non-dusting.

B. Earthy soft brown coal having a typically earthy, uneven and blunt fracture of loose to solid texture, mostly slightly staining and dusting.

In the present context lignite preferably falls under the definition of slaty soft brown coal ("Scheifrige Weichbraunkohle"). Especially brown coal falling within the category of the younger, slaty soft brown coal is mostly designated lignite. However, this designation applies to the components comprised therein, which components also exhibit microscopically typical wooden structure.

Lignite is a relatively stable and substantially inert material and may be viewed as an intermediate stage in the transition from pure plant material to coal, where the decomposition takes place in the deeper parts of the earth's crust. Lignite is substantially free of pathogens harmful to fungi and may be used without any prior disinfection process and the preferred type of lignite will contain at least 60% of carbon on a dry, ash free basis and less than 1.5% of nitrogen on a dry, ash free basis. Substantially all of the carbon in the lignite is considered available to the fungi.

The lignite normally used as an additional component comprises on a water and ash free basis from about 60 to about 75 percent by weight of carbon, from about 17 to about 33 percent by weight of oxygen and from about 3 to about 8 percent by weight of hydrogen, from about 0,1 to about 10 percent by weight of sulphur, and from about 0,4 to about 3 percent by weight of nitrogen. Contrary to peat, lignite is, furthermore, substantially free of free and, thus, readily biodegradable cellulose.

An especially preferred composition of lignite for the use in accordance with the present invention has an approximate analysis as follows (approximate values on a dry, ash free basis):

Carbon about 64%
Hydrogen about 5%
Nitrogen about 1%
Sulphur about 3%
Oxygen about 27%

Lignite normally also contains small amounts of elements important for the growth of the fungi, e.g. elements like iron, magnesium and/or potassium. Lignite is a cheap material available in a uniform quality and is, moreover, available in large quantities as a byproduct from the mining of kaolinite clay types. Lignite is typically available in a crushed form as solid particles having particle sizes in the interval from 0.05 to 4 mm.

As apparent from the examples, it is important that the casing material has a stable structure. If the casing material, when saturated with water, which occurs when the water content is from about 35 to about 70% on a volume basis, as determined at a suction pressure of 10 cm on a calibrated sand bed, exhibits a collapse, measured in mm of casing material, which is at the most 50% compared to the same casing material thickness having a water content of at the most 25% on a volume to volume basis, the casing material of granules or agglomerates will normally have the structural properties that will support the growth of most species and strains of fungi.

This means that when a casing material of granules or agglomerates having a water content of 25% by volume is applied onto the solid nutritive medium in a material in a depth of 50 mm, the water applied to saturate the casing material, as determined when any run-off of water from the casing material is seen, must not compress the material to a depth less than 25 mm.

However, for certain strains or species of fungi it is preferred that the collapse of the casing material is at the most 20%.

If the content of mineral elements in the casing material is low, or if the nutrient source component present does not supply any mineral elements, it is possible to establish a supply of important minerals, e.g. potassium and iron, by adding a clay material to the casing material in an amount normally from about 1 to about 15% by dry weight of the casing material. In most cases an addition of clay to the casing material in an amount from 2 to 8% by dry weight is considered ideal.

The clay is typically selected from the group comprising mineral clay types and diatomaceous clay types or the like, and combinations thereof. Normally, the clay should have a density of at the least 700 $g \times l^{-1}$.

In most cases, the clay has a particle size from about 0.1 mm to about 10 mm however, a particle size from about 2 to about 8 mm is preferred. The clay, being a mineral clay, normally comprises at least 50% by weight of montmorillonite, and, in a casing material of granules or agglomerates, will serve as a storage for the minerals, so that, when in contact with water, a low amount of minerals will slowly be released from the clay and the minerals will thereby be made available to the fungi in the casing material.

The addition of clay is preferred over the addition of pure salts like e.g. magnesium sulphate, which, being easily soluble in water, will tend to make the salt concentration of the casing material difficult to control.

In order to enhance the distribution of water added to the casing material, e.g. when the binding agent binding the mineral fibres together has a water-repellent reaction, the granules or agglomerates may comprise a wetting agent that will counteract the influence of the water-repellency of such a binding agent. The surface tension of the entire mineral fibre structure of granules or agglomerates may by reduced when a wetting agent is present thereby generally improving the conditions for uptake of water in the right amount into the casing material e.g. when the first irrigation is applied to the casing material.

In the present context a wetting agent may be an anionic, a cationic or a non-ionic type or even an organic material that will modify the osmotic pressure such as a polyethylene glycol (PEG) or the like, and combinations thereof added to the mineral fibres in an amount not harmful to the fungi.

Examples of suitable wetting agents are, e.g. various ethylene or propylene oxide condensates.

The invention also relates to a casing material for the use in the production of fungi.

In such a casing material for use in the production of fungi, the casing material comprises granules, and/or agglomerates of granules, of a mineral fibre structure; the granules or agglomerates of the casing material have a bulk water capacity of at least 300 grammes per 100 grammes dry weight of the granules or agglomerates, determined at a suction pressure of 10 cm on a calibrated sand bed; and the casing material has a water retaining capacity, determined at a suction pressure of 100 cm on a calibrated sand bed, of at the most 15% by volume of the casing material.

In an other preferred embodiment the casing material for use in the production of fungi, the casing material comprises granules, and/or agglomerates of granules, of a mineral fibre structure, and where in addition to the granules, or agglomerates of granules, the mineral fibre structure contains at least one additional component distributed in the material; the granules or agglomerates of the casing material without the additional component or components have a bulk water capacity of at least 300 grammes per 100 grammes dry weight of the granules or agglomerates, determined at a suction pressure of 10 cm on a calibrated sand bed, and the casing material comprising the granules, or agglomerates of granules with the additional component or components has a water retaining capacity, determined at a suction pressure of 100 cm on a calibrated sand bed, of at the most 15% by volume of the casing material.

As shown in the examples, a casing material of granules or agglomerates of granules of a mineral fibre structure for the use in a mushroom crop comprises a composition made from the following ingredients (expressed in grammes per liter on a dry weight basis of the ingredients—approximate values):

| Contents of dry materials | Grammes per litre (approx. values) |
| --- | --- |
| Mineral fibres | 120 |
| Nutritional source (lignite) | 80 |
| Mineral source (clay) | 26 |

Water is added to the materials given above, the water added will normally constitute from 5 to 60% of the dry weight of the ingredients. From a practical point of view, it is preferred that the water content in the casing material is from about 20 to about 45% of the dry weight of the ingredients, and typically from about 30 to about 40%.

The addition of water occurs with a constant mixing of the ingredients of the composition, and after mixing the resulting product appears as a more or less free flowing material that is ready to be applied onto a solid compost material as a casing layer. Including the amount of water added, the casing layer of the above composition will normally have a density from about 280 to about 350 kg per cubic meter of casing layer.

The present invention also relates to a casing material formulation of granules or agglomerates of granules of a mineral fibre structure that may be supplied to a casing material or added to the solid compost medium as an inoculating agent (casing spawn) with the intention to reduce the time span from the application of the casing material on a solid nutritive medium until a full colonization of the casing material has taken place and the production of fruiting bodies commences.

The casing spawn may be formulated in a manner that includes combinations possible from the above, and will further comprise the mycelia of the fungus/fungi that is/are to be inoculated in either the casing material and/or the solid nutritive medium.

Moreover, the present invention relates to a method for preparation of a casing material of granules and/or agglomerates of a mineral fibre structure used in the production of fungi.

The method described in detail below is applicable for the preparation of any kind of product based on flowable and non-dusting mineral fibres. Thus, the method according to the invention is suitable for the conversion of relatively non-flowable raw materials of mineral fibres to flowable materials for the production of a granular form of mineral fibres, and, of course, also for the preparation of casing materials for the use according to the present invention. It should be noted that the disclosure given below with respect to the preparation of a casing material applies mutatis mutandis to the preparation of other flowable mineral fibre based products.

The method for the preparation of a casing material comprising granules and/or agglomerates of a mineral fibre structure used in the production of fungi said method comprising i) loading of a mixer with a substantially dry raw material of mineral fibres;

ii) optionally pre-mixing of the raw material of mineral fibres;

iii) mixing of the raw material of mineral fibres with a simultaneous and controlled supply of a liquid to obtain a substantially flowable and non-dusting casing material, the supply of the liquid being controlled in such a manner that the raw material of mineral fibres, when sampled, is moisturized to an extent that a substantially homogeneous and flowable material of granules and/or agglomerates of granules of a mineral fibre structure is obtained.

In the present context, a raw material of mineral fibres designates a material of mineral fibres wherein the mineral fibres are in the form of i) loose, individually organized mineral fibres, ii) irregular flock-like bodies of at least two mineral fibres, iii) loose aggregates of such bodies, iv) particles having a more or less clearly defined form such as a round or cubic form and the like, and combinations thereof.

The raw material of mineral fibres may optionally contain a binding agent binding individual mineral fibres together and it may optionally contain an agent such as a mineral oil making the mineral fibre material water-repellent, or an agent making the material of mineral fibre water-absorbent, or combinations thereof.

The raw material of mineral fibres may be relatively water-repellent or relatively water-absorbent or any combination thereof.

Before loading the mixer the raw materials and the additional component or components will normally have a moisture content below about 20% such as, e.g., below about 15%, such as, e.g., below about 10%, such as, e.g., below about 5%, or such as, e.g., below about 1% based on the dry weight of the raw materials and any additional component or components.

In most cases the mean fibre diameter of the mineral fibres in the raw material will be in the range from 1 to 20 $\mu$m, but will typically be in the range from 2 to 8 $\mu$m, where fibres having a diameter between 3 and 5 $\mu$m are especially suitable when determined by a measurement technique that makes use of a scanning electron microscope or a particle analyzer.

The content of non-fibrous matter ("shot") associated with the raw material of mineral fibre which has its origin in the manufacturing of mineral fibres, constitute typically from about 1 to about 50% of the total weight of the granules or agglomerates of a mineral fibre structure, typically below 10% for a glass wool fibre based material and typically from 10 to 40% for a stone wool or slag wool fibre based material.

Normally, the mineral fibres of the raw material of mineral fibres will be of a mean length of from about 1 $\mu$m to about 5,000 $\mu$m.

The specific bulk density of the mineral material used in the production of the raw material of mineral fibres is between 2,500 and 3,000 g$\times$l$^{-1}$, typically from about 2,600 g$\times$l$^{-1}$ to about 2,800 g$\times$l$^{-1}$.

The raw material of mineral fibres as indicated above will when being loaded into the mixer normally be a relatively light weight material, e.g. having a density of below about 350 g$\times$l$^{-1}$, such as, e.g., below about 300 g$\times$l$^{-1}$, such as, e.g., below about 250 g$\times$l$^{-1}$, such as, e.g., below about 200 g$\times$l$^{-1}$, such as, e.g., below about 150 g$\times$l$^{-1}$, such as, e.g., below about 100 g$\times$l$^{-1}$, such as, e.g., below about 75 g$\times$l$^{-1}$, such as, e.g., below about 50 g$\times$l$^{-1}$, such as, e.g., below about 25 g$\times$l$^{-1}$, such as, e.g., below about 10 g$\times$l$^{-1}$, and a material which furthermore, due to the low water content, is very dusty.

The raw material of mineral fibres will typically be introduced in the mixing process in a relatively compressed form but the raw material will normally self-expand and/or become loosened during the actual process of loading the mixer with the raw material, and will then reach a relatively low volume weight as indicated above.

As it is evident from the definition of the term "granules" used in the present context, the raw material of mineral fibres is not encompassed by this definition as the raw material is non-flowable.

By people skilled in the art of production of mineral fibres, the flock-like bodies and/or particles of the raw material of mineral fibres are normally labelled as a granulated or granulate product of mineral fibres. The raw material of mineral fibres has typically a particle or flock size from about 1 mm to about 100 mm such as, e.g., from about 5 to about 50 mm, or even such as, e.g., from about 10 to about 30 mm determined as the length of the largest crossline section.

The properties of the raw materials of mineral fibres make them substantially non-flowable. Thus, such raw materials of mineral fibres are generally not considered suitable for direct use, e.g. as a casing material in the production of fungi, and a process that changes the properties of such raw materials of mineral fibres to a substantially flowable and non-dusting material is required.

For the preparation of a flowable material of granules and/or agglomerates of granules of a mineral fibre structure from such raw materials of mineral fibres, it is necessary to moisten the raw materials of mineral fibres and it has proven advantageous to perform this operation using a suitable mixer.

In the present context, the term flowable is used to describe materials that can be discharged or poured from one container into another container, or from a container onto the site where the prepared material is to be used, substantially without manipulating the material e.g. by hand or by the use of technical or mechanical means such as worm or screw transporters and the like, or combinations thereof.

During operation, the mixer should be able to circulate, whirl or throw the substantially dry material of mineral fibres in an air space contained inside the mixer in such a manner that the raw material of mineral fibres and the fibres thereof are exposed considerably to the substantially unobstructed zone or zones of the mixer where a necessary supply of a liquid typically will take place.

The mixer being able to, mechanically or by the use of a gas such as air, circulate, whirl or throw a raw material of mineral fibres in the air space contained inside the mixer, will tend to reduce the destruction of the light weight bodies and/or aggregates of bodies of the raw material.

Furthermore, any process of breaking up the relatively non-elastic and brittle mineral fibres of the raw material into fragments of mineral fibres will be relatively limited because a main part of the raw material will not normally collide with the internal surfaces of the mixer.

Nevertheless, it is possible to use other types of mixers such as rotating drum-shaped mixers; and gravity mixers holding the mineral fibre material inside the mixer; positive action mixers that use other means such as a worm or a screw or the like to introduce a liquid or an additional component or components into a material of mineral fibres either mechanically or by the use of a gas, e.g. air, or gravity and/or centrifugal forces, or a combination thereof.

The mixer will typically contain at least one rotating axle substantially arranged in a horizontal position in the mixer. The rotating axle or axles will typically comprise agitation means for the mixing of the raw material such as bars, rods or blades or the like, or combinations thereof.

An optional step of pre-mixing the raw material of mineral fibres without any supply of liquid is performed to make sure that the relatively dry raw material is properly distributed or dispersed in the free air space contained in the mixer.

The optional pre-mixing treatment of the substantially non-flowable and relatively dry raw material of mineral fibres is believed to reduce the amount of un-mixed material that will occur if the supply of the liquid is performed immediately after the loading of the mixer.

Normally, the optional pre-mixing stage will take place during a predetermined time period depending on the mixer used. When using a mixer as described above, the optional pre-mixing time will be such as below about 30 seconds such as, e.g., below about 20 seconds such as, e.g., below about 15 seconds such as, e.g., below about 10 seconds such as, e.g., below about 5 seconds, or below such as, e.g, 1 second per 100 kg of a raw material of mineral fibres for the preparation of a substantially flowable material of granules or agglomerates.

The optional process of pre-mixing may also take place as in at least two separate steps, each step lasting no more than 30 seconds.

The circulating raw materials are then subjected to a controlled addition of a liquid. Examples of suitable liquids for the method are e.g. water; an aqueous medium comprising at least one additional component; an aqueous suspension and/or an emulsion comprising at least one additional component; or an organic solvent; an organic solvent comprising at least one additional component, and combinations thereof. An aqueous medium is preferred.

In order to be able to prepare a flowable material, the raw material should be moistened with a liquid. A control of the liquid supply has proven to be very important for the quality of the resulting material obtained, and preferably, the supply of the liquid such as water to the raw material of mineral fibres takes place during the mixing by means of a liquid inlet in the mixer itself.

The supply means for the liquid are normally present in the form of a nozzle or nozzles or arrangement of nozzles or similar outlets that is/are able to supply the liquid in an amount from about 0.001 liter×sec$^{-1}$ to about 10 liters×sec$^{-1}$ per nozzle, and should furthermore be capable of supplying the liquid as droplets or fine particles having a mean size of below about 50,000 $\mu$m such as, e.g., below about 10,000 $\mu$m such as, e.g., below about 5,000 $\mu$m such as, e.g., below about 1,000 $\mu$m such as, e.g., below about 500 $\mu$m such as, e.g., below about 100 pm such as, e.g., below about 50 $\mu$m or such as below about 10 $\mu$m, or combinations thereof.

The nozzle or nozzles form the liquid droplets by applying a relatively high pressure using a high pressure pump to the liquid dosed per se. A pressure of above about 2 bar such as, e.g., above about 5 bar such as, e.g., above about 10 bar, or such as, e.g., above about 25 bar such as, e.g., above about 50 bar such as, e.g., above about 100 bar such as, e.g., above about 200 bar, or such as, e.g., above about 250 bar, or combinations thereof has been proven suitable.

In some situations it may be suitable to supply the liquid to the mixer as at least one fine jet, the amounts supplied being similar to those mentioned above in relation to the supply via nozzles.

Normally, the liquid supplied is water or an aqueous solution containing an additional component or components or a suspension of an additional component or components or a combination thereof, and is normally supplied through the nozzle, nozzles or similar types of outlets utilizing a pressure such as determined by the mains pressure in the water supply.

Alternatively, or in combination with the above, the nozzle or nozzles may be of a two-phase nozzle type as used in spray-drying processes where the formation of the liquid droplets or discrete particles is caused by allowing a fast air stream to pass the pressurized liquid stream thereby splitting the liquid into droplets.

The preparation of a casing material of granules or agglomerates may further comprise the introduction of an additional component or components, and normally the additional component or components is/are introduced before or when optionally pre-mixing the raw material of mineral fibres or a combination thereof, i.e. before the supply of a liquid.

When the optional pre-mixing process is completed, a supply of a liquid to the raw material of mineral fibres begins. If no pre-mixing of the raw materials is performed, the addition of a liquid to the raw material normally commences without any interruption of the mixing process.

The supply of the liquid, via the nozzle or nozzles, is typically established in such a manner that the flow of droplets, jets or particles of the liquid supplied, substantially collides with at least a part of the mineral fibre material and/or individual mineral fibres while this/these is/are floating in the air volume contained in the mixer.

A collision of the solid material and the liquid during floating is obtained if e.g. the nozzle or nozzles is/are placed in or on at least one rotating axle contained in the mixer or at the periphery of the mixer e.g. such as near the top half of the mixer and/or at least above the centre of the rotating axle or axles. The outlet(s) of the nozzle or nozzles substantially faces/face the volume constituted by the top half of the mixer or the volume defined from above the center of the rotating axle or axles to the top of the mixer.

A flowable casing material of granules or agglomerates of granules will be obtained from the mixing process because the amount of liquid supplied to the part of the raw material of mineral fibres floating in the air contained in the mixer is disseminated or dispersed very rapidly in the relatively dry raw material and in such a manner that this will typically occur while the raw material is airborne.

When the dispersion of the liquid in the raw material of mineral fibres is complete, the liquid will be loosely fixed or held in the still fuzzy structure of the raw material of mineral fibres.

If the supply of the liquid occurs while the raw material of mineral fibres and/or individual mineral fibre thereof is/are not airborne, the mineral fibre material will very quickly, due to the relatively dry condition and relatively high affinity for the liquid dosed, tend to form relatively large and heavy aggregates or lumps from which the formation of granules or agglomerates will be substantially impossible, and, further, there is a risk that the mixer will be blocked by the weight and structure of the mineral fibre material created thereby.

Thus, the principle of supplying a liquid in a controlled manner to the raw material is very important for obtaining the desired flowable and non-dusting product, e.g. casing material or a material of granules or agglomerates of a mineral fibre structure used in other applications, etc.

It has been found that in order to prepare a substantially flowable and non-dusting casing material of granules or agglomerates, the mixing must take place within a pre-determined time window or time interval depending on the amount of raw material of mineral fibres being mixed and the amount of liquid to be added during mixing.

If the mixing process, during which the raw material of mineral fibres are continuously circulated, whirled or thrown in the air space surrounded by the outline of a mixer, continues simultaneously with the addition of a liquid for a period longer than given by the predetermined time interval, the raw material of mineral fibres will, due to the weight of the liquid added and the influence of the mixing per se, either tend to disintegrate into individual mineral fibres or fragments of individual fibres or even to block the mixer.

On the other hand if the mixing process is running for too short a period, the raw material of mineral fibres prepared will tend to appear relatively dusty due to the relatively low amount of added liquid, and furthermore, as a consequence of a relatively low amount of liquid being added and a relatively short mixing period, the end product will tend to be an inhomogeneous and non-flowable material and considered unsuitable for use as e.g. a casing material.

In the case that the mixing time is reduced and at the same time the dosage rate of the liquid increased, provided that the amount of raw material of mineral fibres is identical to the amount in the scenario above, the liquid added under these circumstances will cause the relatively dry raw material of mineral fibres to form lumps or relatively large and heavy aggregates of raw material which may destroy the raw material of mineral fibres making the preparation of granules or agglomerates virtually impossible.

As stated above, the manner in which the addition of a liquid to the raw material of mineral fibres is carried out determines whether the casing material obtained from the mixing process possesses the required properties.

Hence, the supply rate of the liquid to an amount of 100 kg of the raw material of mineral fibres is normally from about 0.001 liter×sec$^{-1}$ to about 10 liters×sec$^{-1}$ such as, e.g, from about 0.01 liter×sec$^{-1}$ to about 5 liters×sec$^{-1}$, or, e.g., from about 0.1 liter×sec$^{-1}$ to about 1 liter×sec$^{-1}$.

The addition of the liquid at the rates indicated above per 100 kg of raw material of mineral fibres will normally occur during a pre-determined time interval from about 1 second to about 360 seconds, such as, e.g., from about 10 seconds to about 240 seconds, or, e.g., from about 45 to about 180 seconds.

As shown in the examples, the concentration of a liquid such as water in a casing material of granules or agglomerates will normally deviate less than below about 10% such as, e.g., below about 5%, or even below about 1% of the mean water concentration of the casing material. The mean water concentration is normally between about 5% and about 60% of the dry weight of the casing material.

Such casing material prepared according to the invention has the required properties with regard to flowability and homogeneity. Furthermore, as discussed above, such casing material has proven very advantageous in the production of fungi.

One way to check whether the preparation of the casing material is performed during the predetermined time interval is by controlling the actual content of liquid in a series of sub-samples of about 10 to about 100 grammes of the casing material produced, the sub-samples being sampled from a limited amount of at the least 10 liters of the casing material prepared.

Another way to check that the preparation of the casing material is performed during the predetermined time interval, and that a homogeneous material is obtained, is by adding fine particles of a dye, such as carbon black or any other solid dye that has a colour which is clearly different from the colour of the raw material of mineral fibres, during the mixing process.

The dye particles are added as a liquid suspension or an emulsion containing the dye particles and via the nozzle or the nozzles that normally doses/dose the liquid or dry particles.

The particles of the dye should, when added, be able to stain or colour the raw material of mineral fibres so that at least about 10 liters such as, e.g., about 5 liters such as, e.g., about 2 liters such as, e.g., about 1 liter, or such as, e.g., 0,5 liter of the casing material, when mixed appear uniformly coloured manifested by the fact that the non-stained or non-coloured domain or domains of the casing material of granules or agglomerates prepared has/have a size of less than below about 50 mm such as, e.g., below about 40 mm such as, e.g., below about 30 mm such as, e.g., below about 20 mm such as, e.g., below about 10 mm such as, e.g., below about 5 mm such as, e.g., below about 1, or such as, e.g., below about 0.1 mm.

In fact, the mixing process should lead to the formation of a casing material where at least a part of the particles of the dye should end up being embedded or contained within the structure of the granules or agglomerates being formed by the mixing process.

As indicated above, the mixing process according to the invention will establish a substantially flowable casing material of granules or agglomerates.

Flowability of the casing material of granules or agglomerates is typically obtained if at least e.g. 30%, 40% or even at least 50% of the volume of the granules prepared have a size from about 0,5 to about 40 mm, or such as at least 30%, 40% or even at least 50% by volume of the granules have a size from about 1 to about 30 mm or even if at least 30%, 40% or even at least 50% by volume of the granules have a size from about 2 to about 15 mm.

The mixing process is normally performed based on the loading of the mixer with i) the raw material of mineral fibres and ii) a liquid such as water in ratios such as from about (i:ii) 1:0.1 to about 1:5, in some cases such as from about 1:0.5 to about 1:2, or even from about 1:0.1 to about 1:1.5 on a weight to weight basis.

As indicated above the preparation of a casing material may include the addition of an additional component or components.

The additional component or components may be added as a liquid suspension via the nozzle or nozzles that normally dose the liquid and/or as dry, solid particles.

The additional components may be added to the raw material in a step prior to the loading of the mixer, in a step associated simultaneously with the loading of the mixer, or even in a step after loading of the mixer with the raw material of mineral fibres.

If the preparation involves the addition of an additional component or components to the raw material of mineral fibres the addition of such is/are based on loading the mixer with i) the raw material of mineral fibres and ii) the additional component or components in ratios such as from about (i:ii) 1:0.00001 to about 1:5.0, in some cases such as from about 1:0.001 to about 1:2, or such as from about 1:0.1 to about 1:1.5, on a weight to weight basis.

The relationship between i) the raw material of mineral fibres, ii) the liquid and iii) the additional component or components loaded into the mixer according to the method described in the above, may be such as from about (i:ii:iii) 1:0.1:0.00001 to about 1:5:5, in some cases such as from about 1:0.5:0.001 to about 1:2:2, or such as from about 1:0.1:0.1 to about 1:1.5:1.5, on a weight to weight basis.

DESCRIPTION OF THE DRAWING

The invention is further illustrated in the accompanying FIG. 1 which diagrammatically illustrates what may be considered an advantageous lay out of a production plant used for the preparation of a flowable mineral fibre based material such as a casing material of granules or agglomerates of granules.

1 Raw material of mineral fibres
2 Tank holding the raw material of mineral fibres
3–5 Hopper for storage of additional components
6–8 Outlet from hopper for supply of additional components
9 Conveyor
10 Reservoir for the raw material of mineral fibres with/without additional components
11 Mixer
12–13 Rotating axles with blades
14 Direction of rotation
15–16 Line for supply of a liquid
17–18 Nozzles for outlet of the liquid supplied to the mixer
19 Mineral fiber material in mixing
20 Reservoir for mixed material
21 Material of granules and/or agglomerates
22 Conveyor
23 Accumulation tank for mixed material
24–25 Conveyors
26 Bagging unit for bags from about 10 to about 100 liters
27 Bagging unit for big-bags above 100 liters The raw material of mineral fibres 1 is discharged from the supply tank 2 onto the conveyor 9. Additional components are held in the hoppers 3–5 and optionally discharged onto the conveyor 9 through the outlets 6–8. The raw material 1 with or without additional components is fed into the reservoir 10 from which the raw material is loaded into the mixer 11. The mixer 11 is provided with two axles with blades 12–13 and is rotating in the indicated direction 14. The liquid is supplied through the lines 15–16 and the liquid is supplied to the raw material being mixed 19 by the nozzles 17–18. After mixing, the material is discharged as a flowable material of granules and/or agglomerates of granules 21 onto a conveyor 22 and transported to an accumulation tank 23 where the flowable material 21 is held before transporting the flowable material either on a conveyor 24 to a bagging unit for the production of bags containing from about 10 to about 100 liters of the flowable material 26 or on a conveyor 25 to a bagging unit for the production of bags containing over 100 liters of the flowable material 27.

Figure 1:
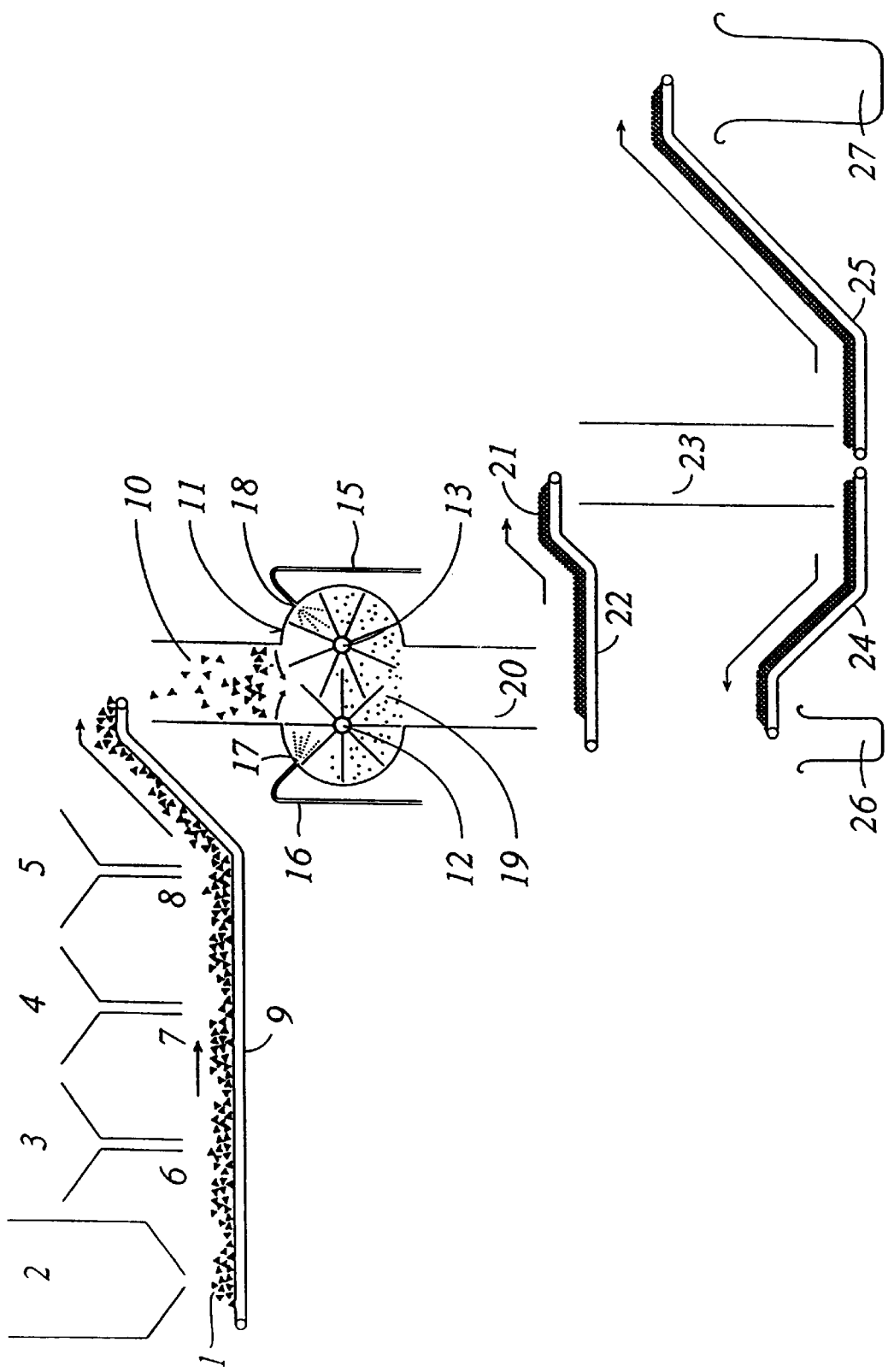

As evident from FIG. 1 and from the description of the process above, as well as the examples, it is clear that the method for preparing a flowable casing material may be used for preparing other flowable materials or products of granules or agglomerates of granules based on a raw material of mineral fibres not necessarily intended for use in the production of fungi.

EXAMPLES

The following examples are provided for illustrative purposes only. They are not construed to limit the scope of the present invention in any way.

Example 1

Establishment of mycelial growth in a casing material of granules and/or agglomerates of granules In order to establish whether mycelia would colonize and form fruiting bodies in a casing material comprising granules and/or agglomerates of a mineral fibre structure according to the invention, as well as to assess the impact of selected additional components on the individual phases of a mushroom crop using such a casing material, a multifactorial experiment was set up.

The experiment was laid out as a 3×3×3 multifactorial type trial with 6 replications of each treatment. The treatments were based on 27 compositions of a casing material all as granules or agglomerates of mineral fibres.

About 70% of the granules used for the experiment had a diameter of from 3 to 20 mm, and the water capacity was in the range from 300 to 400 grammes per 100 grammes of casing layer. The granules were of a type made from mainly water-absorbent mineral fibres of the type marketed as Grodan® GU-10 and available from the company Grodania A/S in Denmark.

To the granules or agglomerates was added chalk, 0,1–2 mm particles (a liming material), available from Faxe Kalk in Denmark, lignite, 0,1–4 mm particles (a nutrient source) from the company Watts, Blake and Burne in England, and a mineral clay, specified as 2–8 mm particles (a mineral source), from the company Tierra Products in Denmark, with simultaneous addition of water and with a simultaneous and constant mixing of all ingredients added.

In the experiment, casing material compositions with chalk and lignite, chalk and clay, and lignite and clay were tested against a casing material based entirely on granules or agglomerates of a mineral fibre structure.

In the casing material compositions tested, the amount of granules or agglomerates was fixed to 120 grammes dry weight of granules or agglomerates per liter casing material.

Compositions including chalk contained 0, 15 or 30 grammes dry weight of chalk per liter of casing material.

Compositions including lignite contained 0, 20 and 40 grammes dry weight of lignite per liter of casing material.

Compositions including clay contained 0, 26 and 52 grammes dry weight of clay per liter of casing material.

Before application of the prepared casing material compositions onto the solid compost layer, water was added in order to settle the water content in the casing material samples to a level from about 30 to about 45% of the dry weight of the solid components of the casing layer.

When added, the nutrient source (lignite) constituted from about 10 to about 25% of the dry weight of the casing material composition. The carbon content of the lignite was at least 60% on a dry, ash free basis.

When added, the mineral source (clay) constituted from about 15 to about 35% of the dry weight of the casing material composition, and, when added, the liming material (chalk) constituted from about 10 to 25% of the dry weight of the casing material composition.

The surface area of the mineral fibre structure of the granules as tested was from about 23,000 to about 40,000 $m^2 \times m^{-3}$ of the casing layer, selected as suitable for the casing depth chosen for this experiment ranging from 10 to 40 mm, typically 25 mm.

The density of the prepared casing materials was within the range of 150 to 380 $g \times 1^{-1}$ of casing material, depending on the amount of additional components added.

During the growth of mushroom mycelia and the following development of fruiting bodies from the casing materials, assessments of the mushroom crop were made by people skilled in the art of growing mushrooms. The assessments were based on the perceived quality of the following phases of the crop:

1. colonization of the mycelia in the casing material, rated as a value on a scale from 1 to 5;
2. quality of first pinning, rated as a value on a scale from 1 to 5;
3. quality of second pinning, rated as a value on a scale from 1 to 5;
4. coverage of casing with fruiting bodies, rated as a value on a scale from 1 to 5;
5. number of days from application of casing material to harvest.

Data from the test concerning compositions with chalk and lignite are shown in Tables 1a, 2a, 3a, 4a and 5a.

Data from the test concerning compositions with chalk and clay are shown in Tables 1b, 2b, 3b, 4b and 5b.

Data from the test concerning compositions with lignite and clay are shown in Tables 1c, 2c, 3c, 4c and 5c.

1. Colonization of the casing material of granules

TABLE 1a

Effect of liming material and lignite levels

| Lignite | Chalk 0 | Chalk 15 | Chalk 30 | Mean |
|---|---|---|---|---|
| 0 | 0.9 | 1.0 | 0.9 | 0.9 |
| 20 | 2.8 | 2.8 | 2.6 | 2.7 |
| 40 | 2.8 | 3.3 | 3.0 | 3.0 |
| Mean | 2.2 | 2.3 | 2.2 | 2.2 |

TABLE 1b

Effect of chalk and clay levels

| Clay | Chalk 0 | Chalk 15 | Chalk 30 | Mean |
|---|---|---|---|---|
| 0 | 2.1 | 2.1 | 2.0 | 2.1 |
| 26 | 2.3 | 2.6 | 2.2 | 2.4 |
| 52 | 2.2 | 2.3 | 2.3 | 2.3 |
| Mean | 2.2 | 2.3 | 2.2 | 2.2 |

TABLE 1c

Effect of lignite and clay levels

| Clay | Lignite 0 | Lignite 20 | Lignite 40 | Mean |
|---|---|---|---|---|
| 0 | 0.6 | 2.6 | 3.0 | 2.1 |
| 26 | 1.1 | 2.9 | 3.1 | 2.4 |
| 52 | 1.2 | 2.7 | 3.0 | 2.3 |
| Mean | 0.9 | 2.7 | 3.0 | 2.2 |

LSD at 5% level between means 0.3
2 way interactions 0.5

With respect to colonization of the casing material, an acceptable level is reached if the colonization index is above 3.

The data recorded for colonization of the casing materials tested reveal that the mycelia will colonize the casing material and that there is significant impact on the level of colonization when the level of lignite in the casing material is increased.

2. First pinning quality assessment

TABLE 2a

Effect of liming material and lignite levels

| Lignite | Chalk 0 | Chalk 15 | Chalk 30 | Mean |
|---|---|---|---|---|
| 0 | 0.7 | 0.1 | 0.3 | 0.3 |
| 20 | 1.9 | 1.8 | 1.9 | 1.9 |
| 40 | 2.5 | 2.3 | 2.0 | 2.3 |
| Mean | 1.7 | 1.4 | 1.4 | 1.5 |

TABLE 2b

Effect of chalk and clay levels

| Clay | Chalk 0 | Chalk 15 | Chalk 30 | Mean |
|---|---|---|---|---|
| 0 | 1.3 | 1.4 | 1.4 | 1.4 |
| 26 | 1.8 | 1.6 | 1.5 | 1.6 |
| 52 | 1.9 | 1.3 | 1.3 | 1.5 |
| Mean | 1.7 | 1.4 | 1.4 | 1.5 |

TABLE 2c

Effect of lignite and clay levels

| Clay | Lignite 0 | Lignite 20 | Lignite 40 | Mean |
|---|---|---|---|---|
| 0 | 0.0 | 1.8 | 2.4 | 1.4 |
| 26 | 0.4 | 2.4 | 2.1 | 1.6 |
| 52 | 0.6 | 1.5 | 2.3 | 1.5 |
| Mean | 0.3 | 1.9 | 2.3 | 1.5 |

LSD at 5% level between means 0.5
2 way interactions 0.8

With respect to the quality of first pinning in the casing material, an acceptable level is reached if the index for the first pinning is about 3. However, if the pinning index is below 2 or above 4, there may be a risk that either too few or too many fruiting bodies are developed.

The data recorded for the first pinning in the casing materials tested revealed that formation of primordia of the mushroom fruiting bodies (pinning) will appear in all but one of the casing the experiment and that there is significant impact on pinning when the level of casing material is increased.

3. Second pinning quality assessment

TABLE 3a

Effect of liming material and lignite levels

| Lignite | Chalk 0 | Chalk 15 | Chalk 30 | Mean |
|---|---|---|---|---|
| 0 | 0.2 | 0.1 | 0.1 | 0.3 |
| 20 | 1.3 | 1.1 | 1.4 | 1.3 |
| 40 | 2.0 | 1.7 | 1.9 | 1.9 |
| Mean | 1.2 | 0.9 | 1.1 | 1.1 |

TABLE 3b

Effect of chalk and clay levels

| Clay | Chalk 0 | Chalk 15 | Chalk 30 | Mean |
|---|---|---|---|---|
| 0 | 1.0 | 0.8 | 0.9 | 0.9 |
| 26 | 1.4 | 1.1 | 1.4 | 1.3 |
| 52 | 1.1 | 0.9 | 1.1 | 1.0 |
| Mean | 1.2 | 0.9 | 1.1 | 1.1 |

TABLE 3c

Effect of lignite and clay levels

| Clay | Lignite 0 | Lignite 20 | Lignite 40 | Mean |
|---|---|---|---|---|
| 0 | 0.0 | 1.1 | 1.7 | 0.9 |
| 26 | 0.3 | 1.8 | 1.9 | 1.3 |
| 52 | 0.1 | 1.0 | 2.0 | 1.0 |
| Mean | 0.1 | 1.3 | 1.9 | 1.1 |

LSD at 5% level between means 0.3
2 way interactions 0.5

With respect to the quality of second pinning in the casing material, an acceptable level is reached if the index for the second pinning is about 3. However, if the pinning index is below 2 or above 4, there may be a risk that either too few or too many fruiting bodies are developed.

The data recorded for the second pinning reveal that formation of the primordia of the mushroom fruiting bodies (pinning) will continue to appear in all but one of the casing materials in the experiment and that there is significant impact on pinning when the level of lignite in the casing material is increased.

4. Coverage of fruiting bodies in selected areas of 0.015 $m^2$

TABLE 4a

Effect of liming material and lignite levels

| Lignite | Chalk 0 | Chalk 15 | Chalk 30 | Mean |
|---|---|---|---|---|
| 0 | 0.4 | 0.1 | 0.4 | 0.3 |
| 20 | 1.6 | 1.8 | 2.3 | 1.9 |
| 40 | 3.0 | 3.0 | 2.8 | 2.9 |
| Mean | 1.7 | 1.6 | 1.8 | 1.7 |

TABLE 4b

Effect of chalk and clay levels

| Clay | Chalk 0 | Chalk 15 | Chalk 30 | Mean |
|---|---|---|---|---|
| 0 | 1.2 | 1.4 | 1.7 | 1.4 |
| 26 | 2.4 | 1.6 | 1.3 | 2.1 |
| 52 | 1.4 | 1.9 | 1.6 | 1.6 |
| Mean | 1.7 | 1.6 | 1.6 | 1.7 |

TABLE 4c

Effect of lignite and clay levels

| Clay | Lignite 0 | Lignite 20 | Lignite 40 | Mean |
|---|---|---|---|---|
| 0 | 0.4 | 1.6 | 2.3 | 1.4 |
| 26 | 0.5 | 2.3 | 3.4 | 2.1 |
| 52 | 0.0 | 1.8 | 3.2 | 1.6 |
| Mean | 0.3 | 1.9 | 2.9 | 1.7 |

LSD at 5% level between means 0.6
2 way interactions 1.0

With respect to coverage on the casing material, an acceptable level is reached if the recorded number is above 2 but not exceeding 4.

Acceptable coverage is apparent from most of the tested materials, and again, a significant impact of coverage is reached when the level of lignite is increased.

5. Number of days from application of casing material to harvest

TABLE 5a

Effect of liming material and lignite levels

| Lignite | Chalk 0 | Chalk 15 | Chalk 30 | Mean |
|---|---|---|---|---|
| 0 | 29.1 | 30.0 | 28.3 | 29.1 |
| 20 | 26.5 | 26.3 | 23.9 | 25.6 |
| 40 | 21.9 | 21.2 | 22.2 | 21.8 |
| Mean | 25.8 | 25.8 | 24.8 | 25.5 |

TABLE 5b

Effect of chalk and clay levels

| Clay | Chalk 0 | Chalk 15 | Chalk 30 | Mean |
|---|---|---|---|---|
| 0 | 27.0 | 26.7 | 25.5 | 26.4 |
| 26 | 24.4 | 24.6 | 23.6 | 24.2 |
| 52 | 26.1 | 26.3 | 25.3 | 25.9 |
| Mean | 25.8 | 25.8 | 24.8 | 25.5 |

TABLE 5c

Effect of lignite and clay levels

| Clay | Lignite 0 | Lignite 20 | Lignite 40 | Mean |
|---|---|---|---|---|
| 0 | 29.1 | 27.1 | 23.0 | 26.4 |
| 26 | 29.1 | 23.3 | 20.3 | 24.2 |
| 52 | 29.2 | 26.4 | 22.0 | 25.9 |
| Mean | 29.1 | 25.6 | 21.8 | 25.5 |

LSD at 5% level between means 1.8
2 way interactions 3.1

With respect to the number of days to harvest, an acceptable level is reached if the recorded number of days is below 22.

Summary of Data Assessment

As is apparent from the above experiments, it has been shown that a casing material of granules or agglomerates of mineral fibre will support a colonization of mycelia and formation of fruiting bodies when arranged on a solid nutritive medium.

From the experiment, it is apparent that addition of a liming material (chalk) to the casing material had no significant effect on its own, and furthermore that no statistical evidence for any interaction with clay, when present, can be found in any of the treatments including chalk.

The addition of the lignite had significant impact on all of the treatments, whereas the effects of clay are less obvious but still significant with respect to pinning and harvesting date.

Example 2
Modification of a casino material by chancing the content of the nutrient source The experiment as described in Example 1 was repeated twice, only changing the amount of lignite added from 0,20 and 40 $g \times l^{-1}$ of casing material to 0,40, and 80 $g \times l^{-1}$ of casing material.

The data from these experiments suggested that lignite should be supplied to the casing material in an amount from about 40 to about 80 $g \times l^{-1}$, from about 25 to about 60% of the dry weight of the casing material, in order to establish the best growth of the particular mushroom strain grown, and also that at these lignite levels, the best quality of fruiting bodies should be obtained.

Example 3
Yield comparison test

This experiment included a casing material of granules of mineral fibre tested against a traditional peat based casing material, the aim being to record differences in yield and quality of fruiting bodies, as well as other relevant parameters related to the production of mushrooms, such as the frequency of irrigation.

The casing material of granules of mineral fibres was of the same types as those used in Example 1 and 2 above, and contained the following ingredients (expressed in grammes per liter on a dry weight basis of the ingredients):

| Contents | Grammes per litre |
|---|---|
| Mineral fibre material | 120 |
| Lignite | 80 |
| Clay | 26 |

The two types of casing material were added to a solid bed of fermented horse manure inoculated with mushroom spawn.

The casing material of granules was not inoculated with mushroom spawn.

The yield data from the experiment is recorded in the table below:

TABLE 6

Yield comparison experiment (kg mushrooms harvested per m² bed)

| | Casing of granules | Casing based on peat |
|---|---|---|
| 1st flush | 10.30 | 7.96 |
| 2nd flush | 7.96 | 8.25 |
| 3rd flush | 3.66 | 4.29 |
| 4th flush | 1.95 | 0 |
| Total | 23.87 | 20.50 |

As is apparent from the data in the table above, the casing material of granules of mineral fibres resulted in a yield that exceeded the yield of the normal casing by over 16%.

It was recorded that despite the fact that the casing material of granules was not inoculated with casing spawn, the colonization and pinning were very satisfactory and was superior to the peat casing also on these parameters.

Quality of harvested mushrooms

Moreover, the experiment established that the mushrooms harvested from the casing material based of granules or agglomerates of mineral fibres had a substantially higher quality, showing less blotchy patching, and were furthermore much cleaner than the mushrooms picked from the normal peat based casing material.

It was reported that the mushrooms harvested from the mineral fibre based casing material had a better taste as well as a better post-harvest quality and a longer shelf life, which was probably related to an increase in the content of dry matter in the fruiting bodies produced from the casing material of granules of mineral fibres.

Observations related to the crop period (number of flushes)

As apparent from the data from the experiment, the mushroom crop in the casing material of granules of mineral fibres produced fruiting bodies for a longer period than a mushroom crop in a normal peat based casing.

This is most likely related to the fact that the stability of a casing material of granules of mineral fibres is higher than the normal peat based casing materials and thereby maintains, for a substantially longer period, the once established favourable conditions for the growth of the mycelia and the formation of fruiting bodies.

Irrigation frequency

It was recorded that the labour input for irrigation of the mushroom crop grown in the casing material of granules of mineral fibres could be reduced by 30% and still achieve a higher yield and a better quality of mushrooms.

A reduction of the irrigation frequency as well as a reduction of the amount of water applied to the mushroom crop will reduce the amount of blotchy patches that will develop on the mushrooms which will, in turn, lead to an increase in the level of quality and the amount of first grade produce.

This is most likely related to the fact that the granules or agglomerates of mineral fibres have a high water content (at least 300 grammes per 100 grammes of the dry weight of the granules or agglomerates), water which is substantially all available to the fungi, and that the structure keeps the space (pores and voids) within and between the granules or agglomerates open, and an environment with a constant and very high humidity is maintained in the casing material, which will support the growth of the mycelia.

When peat is used as a casing material, the high content of organic matter as well as the mechanical introduction of the liming material will cause a structural break down of the material which will tend to reduce the volume of pore space which might hold air and water and subsequently, the volume of the peat based casing available for growth of the mycelia is reduced.

Example 4

The influence of the depth of the layer of the casing material on yield

In order to establish whether the standard casing depth for peat based casing could be reduced using the casing material of granules of mineral fibres without causing a reduction in yield, a trial comparing a traditional casing material and 3 depths of a casing material of granules, was set up.

The casing material of granules contained the same ingredients as the casing material tested in Example 3.

The amount of casing material of granules to be applied onto the solid compost based on fermented horse manure was as follows:

1) a standard amount, equivalent to a casing depth of about 50 mm;
2) 66% of standard amount, equivalent to a casing depth of about 35 mm ;
3) 33% of standard amount, equivalent to a casing depth of about 15 mm.

Peat casing material was arranged on fermented horse manure in an amount that gave the standard depth of 50 mm.

The yield per flush in kg per $m^2$ bed was recorded for the first two flushes, the data shown in Table 7 below.

TABLE 7

Kg of mushrooms harvested per $m^2$

|  | Standard amount of peat casing | Standard amount of casing of granules | 66% of standard amount of casing of granules | 33% of standard amount of casing of granules |
| --- | --- | --- | --- | --- |
| Flush 1 | 12.11 | 15.92 | 15.48 | 13.77 |
| Flush 2 | 8.35 | 11.18 | 9.67 | 15.92 |
| Total | 20.46 | 27.10 | 25.15 | 29.69 |

A substantial increase in yield, from 23 to 45%, can be obtained when mushrooms are allowed to form fruiting bodies from the casing material of granules or agglomerates, compared to the casing material of peat.

It is interesting to note that in this case the reduced amounts of casing material of granules or agglomerates, even down to a casing depth of below 20 mm, gave good yields.

The peat based casing yielded only three flushes whereas the crop in the casing material based on granules yielded four flushes, yield data for the remaining flushes not being recorded.

Example 5

The influence on bulk water capacity on mycelial establishment

In order to establish the influence of the bulk water capacity of the granules or agglomerates on the production of mushrooms, an experiment with two casing materials of granules or agglomerates with different bulk water capacities and two different casing depths-was carried out.

The bulk water capacity of one of the casing materials of granules tested was lowered by addition of granules of a water-repellent mineral fibre structure corresponding to 33.3% by volume of the casing material. The granules of a water-repellent mineral fibre structure contained a mineral oil to provide the water-repellency effect. When using this amount of granules of a water-repellent mineral fibre structure, a bulk water capacity of about 200 grammes per 100 grammes of the casing layer was obtained.

The other type of casing material of granules in the test was identical to the material used in Example 3.

The casing depths were set by application of a casing material in an amount of about 90 kg per $m^2$ of bed which is the standard rate and corresponds to a casing depth from about above 25 to about 50 mm, and alternatively about 40 kg of casing material per $m^2$ bed, corresponding to a casing depth from about 10 to about 25 mm.

Irrigation was applied at intervals and in amounts equivalent to what was applied in the experiment reported in Example 3 above.

The results of the experiment, including the four casing material treatments, ranked the production quality and level the highest when the full rate of casing was applied and when the casing material was based on granules of mineral fibres.

The worst quality produce and lowest yield was obtained from the treatment using the full rate of the casing material that included 33.3% on a volume basis of granules of water-repellent mineral fibres.

The casing materials that included water-repellent mineral fibres led to patchy pinning, probably due to dry spots occurring in the layer of the casing materials, the mushroom crop herein had to be terminated earlier than expected because development of fruiting bodies was poor.

Example 6
Preparation of a casing material

A preparation of a casing material of granules and/or agglomerates of granules was made using a mixer able to whirl and/or to throw a raw material of mineral fibres in the air volume of contained in the mixer and having 8 nozzles placed in the mixer able to supply water as droplets or fine particles to the raw material of mineral fibres during the mixing.

The mixer was provided with two counter-rotating axles on which a series of bars and blades were mounted.

For the preparation of a casing material, the following materials were selected (approximate values):

120 kg of Grodan® water-absorbent mineral fibre of the type designated GU-10 as raw material in substantially dry condition, the raw material of mineral fibres consisted of individual mineral fibres, flock-like bodies of mineral fibres and loose aggregates of bodies of mineral fibres, the flock-like bodies, containing a binding agent and a wetting agent, had a size of about 10 mm, the aggregates had very variable sizes from about above 10 mm to about 75 mm, determined as the length of the largest cross-line section;

80 kg of lignite crushed to fine particle, the particles had a mean particle size of below 4 mm;

23 kg of clay in granular form, the granules had a mean particle size from about 2 to about 8 mm; and 75 kg/liters of water.

The amount of water added to the substantially dry materials was controlled using a water gauge, the accuracy of dosing of water was set to ±1 liter per 75 liter of water added.

The preparation of the casing material proceeded according to the following steps and actions:

i) the raw material of mineral fibres was loaded into the mixer, the mixer used had the axles provided with blades, rotating, and the raw material of mineral fibres was pre-mixed for about 10 to 15 seconds, and the additional components were chosen to bed added at this stage of the mixing;

ii) after the pre-mixing stage, the mixing continued with the addition of water to the raw material of mineral fibres;

iii) the mixing process and the simultaneous addition of the water was set to 120 ±10 seconds, whereafter the addition of water was stopped and the product obtained was ready-to use as a casing material;

iv) post-mixing the casing material without addition of water for about 10 seconds.

The casing material produced was uniform and homogeneous and the agglomerates of granules did not exceed 40 mm.

The casing material was led to a bagging equipment and the filling of the bags was uncomplicated as the casing material of granules or agglomerates after the addition of water appeared flowable and, furthermore, as substantially no dust was released from the casing material while packing the casing material in the bagging unit.

As the lignite added is a dark brown or even black material and the mineral fibre material used as a raw material is very light greyish or yellowish, the result of the mixing process could be gauged by the occurrence of areas of mineral fibre material not being stained or coloured by the lignite in the final casing material of granules or agglomerates.

It was noted that no domain of the casing material of granules or agglomerates less than 10 mm not being stained or coloured by the finer particles lignite, could be found.

In fact, the individual granules, when examined, showed that the finer particles of the lignite had penetrated and thereby embedded the inner structure of the granules of the prepared casing material.

It was established that about 50% of the granules of the casing material had a diameter between 3 and 20 mm.

Example 7
Preparation of various types of casing material

In order to establish whether the mixing process could yield a material of granules or agglomerates using various compositions of raw material of mineral fibres (combinations of the types traded under the names Grodan® GU-10 and Grodan® BU-10), a mixing trial using the same timing and amount of water as in Example 6 was set up for the mixing of 8 (2×4) different compositions.

With respect to amount and type, the additional components were, when added, identical to those used in Example 6.

The following compositions of raw materials of mineral fibres were tested:

i) a mixture of about 20 kg water-repellent and about 100 kg water-absorbent mineral fibre material, with and without additional components;

ii) a mixture of about 40 kg water-repellent and about 80 kg water-absorbent mineral fibre material, with or without additional components;

iii) a mixture of about 60 kg water-repellent and about 60 kg water-absorbent mineral fibre material, with or without additional components;

iv) a mixture of about 100 kg water-repellent and about 20 kg water-absorbent mineral fibre material, with or without additional components, where the raw materials were of a Grodan® type and used in a substantially dry condition, the raw materials of mineral fibres appeared as individual mineral fibres, flock-like bodies of mineral fibres and loose aggregates of bodies of mineral fibres, the flock-like bodies, containing a binding agent and a wetting agent and an agent creating a water-repellency effect (a mineral oil), had a size of about 10 mm, the aggregates had a very variable size from about above 10 mm to about 75 mm determined as the length of the largest cross-line section.

It was observed that the raw material of mineral fibres containing a high proportion, over 100 kg, of water-repellent material did not mix very well, neither when mixed with water alone nor with water and/or additional components. When mixed, all other combinations of raw materials obtained a flowable material of granules or agglomerated of granules that could be filled and packed into bags.

Example 8
Preparation of various casing materials performed using various mixing times A mixing trial as reported in Example 6 above was repeated using the same ingredients in the preparation of a casing material of granules or agglomerates. However, variations in the mixing time (and the amount of water added) was performed in order to establish set points to be used in the industrial preparation of the casing material.

The quality of the prepared casing material of granules or agglomerates was evaluated based on the visual appearance and assessed according to the following scale:

A) the final product is a very homogeneous mix of flowable granules or agglomerates, uniformly coloured by the lignite;

B) the final product is not perfectly homogeneous and un-coloured or unstained areas or domains of above 20 mm are visible, less flowable than the material above;

C) the final product is very inhomogeneous and contains a large proportion of uncoloured and unstained areas or domains of a above 20 mm, substantially non-flowable;
D) not mixed

TABLE 8

The influence of mixing time and amount of water added on the quality of a casing material

| Mixing time in seconds | Corresponding amount of water added (litres) | Quality of final mix |
| --- | --- | --- |
| 30 | 18.75 | C |
| 60 | 37.0 | B |
| 90 | 56.25 | A–B |
| 120 | 75 | A |
| 150 | 93.75 | A |
| 180 | 112.5 | A |
| >180 | >112.5 | mix disintegrated |

The best product, judged by the appearance and the weight, was obtained when the mixing was in the interval between 100 and 150 seconds.

Example 9
Uniformity of the casing material prepared

In order to evaluate the uniformity of dosage of water to the raw material of mineral fibres in the preparation of a casing material of granules or agglomerates, a trial using a fixed mixing time of 120 seconds was set up. During the 120 seconds of mixing, 75 liters ±1 liter of water was added.

54 samples of 25 grammes of granules or agglomerates were taken out during 4 minutes of production, 6 samples each 30 seconds.

The water contained in the samples of each 25 grammes of granules or agglomerates prepared was determined by drying the samples at 140° C. for 45 minutes. The minimum and maximum values as well as the mean value for the water content as percentage of the weight of the dry ingredients were determined.

TABLE 9

Water contained in granules or agglomerates calculated as a percentage of the weight of the dry ingredients

| Sample time intervals | Max water content % | Min water content % | Mean water content % |
| --- | --- | --- | --- |
| 0 | 34.1 | 33.5 | 33.9 |
| 30 sec | 33.9 | 35.1 | 34.4 |
| 60 sec | 35.0 | 34.5 | 34.7 |
| 90 sec | 34.2 | 35.0 | 34.7 |
| 120 sec | 33.7 | 34.9 | 34.4 |
| 150 sec | 34.3 | 34.9 | 34.6 |
| 180 sec | 33.9 | 35.4 | 34.7 |
| 210 sec | 34.5 | 35.3 | 34.8 |
| 240 sec | 34.0 | 36.2 | 34.9 |

As apparent from the data in the table above, the method for mixing a raw material of mineral fibres with water will lead to the formation of a material having a very uniform water content.

Example 10
Various types of flowable materials being prepared from method according to the invention The following flowable mineral fibre based products have been prepared using the principles outlined in the description of the mixing process in example 6, and the flowable products were prepared from the following ingredients (expressed in grammes per liter on a dry weight basis of the ingredients—approximate values):

Product 1
Water-absorbent mineral fibres 120 grammes
Mineral clay 23 grammes
Lignite 80 grammes
To the above ingredients about 70 to 80 grammes of water is added during the preparation of the product.
The water-absorbent mineral fibres were of the type Grodan® GU-10.

Product 2
Water-absorbent mineral fibres 90 grammes
Water-repellent mineral fibres 30 grammes
To the above ingredients about 70 to 80 grammes of water is added during the preparation of the product.
The water-absorbent mineral fibres were of the type Grodan® GU-20. The water-repellent mineral fibres were of the type Grodan® BU-20.

Product 3
Water-absorbent mineral fibres 90 grammes
Water-repellent mineral fibres 30 grammes
Mineral clay 40 grammes
Lignite 25 grammes
To the above ingredients about 70 to 80 grammes of water is added during the preparation of the product.
The water-absorbent mineral fibres were of the type Grodan® GU-20. The water-repellent mineral fibres were of the type Grodan® BU-20.

Product 4
Water-absorbent mineral fibres 90 grammes
Water-repellent mineral fibres 30 grammes
Fertilized mineral clay 40 grammes
Lignite 25 grammes
To the above ingredients about 70 to 80 grammes of water is added during the preparation of the product.
The water-absorbent mineral fibres were of the type Grodan® GU-20. The water-repellent mineral fibres were of the type Grodan® BU-20.

For all of the above products 1–4 the additional ingredients used were as follows:

Lignite, 0,1–4 mm particles (a nutrient source), from the company Watts, Blake and Burne in England, and a mineral clay, specified as 2–8 mm particles (a mineral source), from the company Tierra Products in Denmark. The fertilized mineral clay comprised addition of industrial fertilizers such as magnesium sulphate and the like.

Example 11
Determination of granule sizes

Product 1 from example 10 was subjected to a sieving analysis. The results therefrom are shown in table 10 below.

TABLE 10

Sieve analysis of casing material determined as a mean of 6 analyses

| Mesh size of sieve (interval) | % of total granules fallen through sieve |
| --- | --- |
| 6, 3 mm < X < 12, 5 mm | 11, 7 |
| 3, 15 mm < X < 6, 3 mm | 40, 3 |
| 0 mm < X < 3, 15 mm | 47, 7 |
| Waste | 0, 7 |

Example 12
Determination of water retaining capacity and bulk water capacity

A casing material similar to product 1 described in example 10 was subjected to the test described by R. Gabriels and O. Verdonck in Acta Horticulturae Vol. 294, 1991, pages 249–259 for the determination of water retaining capacity at 10 cm suction (pF 1) and for the determination of bulk water capacity at this particular suction pressure.

The casing material was further subjected to a suction pressure equivalent to 100 cm (pF 2) for the determination of the water retaining capacity at this particular suction.

The results from these tests are shown below in table 11.

TABLE 11

Water retaining capacity and bulk water capacity at pF 1 (10 cm water column) and pF 2 (100 cm water column) determined as a mean of 8 analyses

| Suction pressure (pF) | Bulk water capacity (g H$_2$O/100 g casing material) | Water retaining capacity (vol % water in casing material) |
| --- | --- | --- |
| pF 1 | 630 | 86, 0 |
| pF 2 | 68 | 9, 3 |

I claim:

1. A method for producing mushrooms, wherein the formation of fruiting bodies of the mushrooms is developed from a casing material arranged on a solid nutritive medium for the mushrooms, the casing material comprising at least 60% by volume of at least one of granules and agglomerates of granules, of a mineral fiber structure selected from the group consisting of slag wool fibers, glass wool fibers, stone wool fibers, naturally occurring mineral fibers, and combinations thereof, the granules or agglomerates of the casing material having a bulk water capacity of at least 300 grams per 100 grams dry weight of the granules or agglomerates, determined at a suction pressure of 10 cm on a calibrated sand bed, and the casing material having a water retaining capacity, determined at a suction pressure of 100 cm on a calibrated sand bed, of at the most 15% by volume of the casing material.

2. The method according to claim 1, wherein the casing material, in addition to the granules, or agglomerates of granules, contains at least one additional component distributed in the material, said additional component being selected from the group consisting of nutrient sources for the mushrooms, binding agents, mineral sources for the mushrooms, wetting agents, liming materials, pH adjusting agents, fertilizers, chelating agents, dyes, coloring agents, vitamins, amino acids and combinations thereof.

3. The method according to claim 1, wherein the casing material, in addition to the granules, or agglomerates of granules, contains at least one additional component distributed in the material, said additional component being selected from the group consisting of bacteria, fungal mycelia and combinations thereof.

4. The method according to claim 1, wherein the granules or agglomerates have a bulk water capacity of at least 350 grams per 100 grams dry weight of the granules or agglomerates determined at a suction pressure of 10 cm on a calibrated sand bed.

5. The method according to claim 1, wherein the casing material has a water retaining capacity, determined at a suction pressure of 100 cm on a calibrated sand bed, of at the most 7.5% by volume of the casing material.

6. The method according to claim 1, wherein the granules or agglomerates constitute at least 70% by volume of the casing material.

7. The method according to claim 1, wherein the surface area of the mineral fibers in the structure of granules or agglomerates are in a range of from about 7,500 to about 100,000 m$^2$ per cubic meter of the casing material.

8. The method according to claim 1, wherein at least 50% by volume of the granules have a size from about 1 to about 50 mm.

9. The method according to claim 1, wherein the mushrooms are edible mushrooms.

10. The method according to claim 2, wherein at least a part of the additional component is contained in the granules or agglomerates of the casing material.

11. The method according to claim 2, wherein at least a part of the additional component is deposited on the surface of granules or agglomerates of the casing material.

12. The method according to claim 2, wherein at least a part of the additional component is adhered to the surface of the granules or agglomerates of the mineral fiber structure.

13. The method according to claim 2, wherein the additional component is present in the form of solid particles.

14. The method according to claim 3, wherein at least a part of the additional component is deposited on the surface of granules or agglomerates of the casing material.

15. The method according to claim 3, wherein at least a part of the additional component is adhered to the surface of the granules or agglomerates of the mineral fiber structure.

16. The method according to claim 2, wherein the additional component is a binding agent which constitutes from about 0.5 to about 10% by weight of the granules or agglomerates of the mineral fiber structure.

17. The method according to claim 2, wherein the additional component is an alkaline binding agent.

18. The method according to claim 2, wherein the additional component is a binding agent, wherein at least a part of the binding agent is a nutrient source for the mushrooms.

19. The method according to claim 2, wherein the additional component is a nutrient source for the mushrooms and is distributed in the casing material in a concentration from about 5 to about 70% based on the dry weight of the casing material.

20. The method according to claim 2, wherein the additional component is a nutrient source for the mushrooms and has a carbon content of at least 30% on a dry weight basis.

21. The method according to claim 2, wherein the additional component is a nutrient source for the mushrooms and has a nitrogen content of at the most 3% on a dry weight basis.

22. The method according to claim 2, wherein the nutrient source for the mushrooms is lignite.

23. The method according to claim 2, wherein the mineral source for the mushrooms is clay.

24. A method for producing mushrooms, wherein the formation of fruiting bodies of the mushrooms is developed from a casing material arranged on a solid nutritive medium for the mushrooms, the casing material comprising at least one of granules and agglomerates of granules, of a mineral fiber structure selected from the group consisting of slag wool fibers, glass wool fibers, stone wool fibers, naturally occurring mineral fibers, and combinations thereof, and at least one nutrient source for the mushrooms selected from the group consisting of rice chaff, rice flour, casein, casein hydrolysates, peptones, ceratin, gelatin, egg albumin, sedge based peat, sphagnum based peat, lignite and combinations thereof, the granules or agglomerates of the casing material without the nutrient source for the mushrooms having a bulk water capacity of at least 300 grams per 100 grams dry weight of the granules or agglomerates, determined at a suction pressure of 10 cm on a calibrated sand bed, and the casing material comprising at least one nutrient source for the mushrooms and the granules, or agglomerates of granules, having a water retaining capacity, determined at a suction pressure of 100 cm on a calibrated sand bed, of at the most 15% by volume of the casing material.

25. The method according to claim 24, wherein the casing material, in addition to the nutrient source for the mushrooms and the granules, or agglomerates of granules, contains at least one additional component distributed in the material, said additional component being selected from the group consisting of binding agents, mineral sources for the mushrooms, wetting agents, liming materials, pH adjusting agents, fertilizers, chelating agents, dyes, coloring agents, vitamins, amino acids and combinations thereof.

26. The method according to claim 24, wherein the casing material, in addition to the nutrient source for the mushrooms and the granules, or agglomerates of granules, contains at least one additional component distributed in the material, said additional component being selected from the group consisting of bacteria, fungal mycelia and combinations thereof.

27. The method according to claim 24, wherein the nutrient source for the mushrooms is present in an amount from about 5% to about 70% by the dry weight of the casing material.

28. The method according to claim 24, wherein the granules or agglomerates have a bulk water capacity of at least 350 grams per 100 grams dry weight of the granules or agglomerates determined at a suction pressure of 10 cm on a calibrated sand bed.

29. The method according to claim 24, wherein the casing material has a water retaining capacity, determined at a suction pressure of 100 cm on a calibrated sand bed, of at the most 7.5% by volume of the casing material.

30. The method according to claim 24, wherein the granules or agglomerates constitute at least 60% by volume of the casing material.

31. The method according to claim 24, wherein the surface area of the mineral fibers in the structure of granules or agglomerates are in a range of from about 7,500 to about 100,000 $m^2$ per cubic meter of the casing material.

32. The method according to claim 24, wherein at least 50% by volume of the granules have a size from about 1 to about 50 mm.

33. The method according to claim 24, wherein the mushrooms are edible mushrooms.

34. The method according to claim 25, wherein at least a part of the additional component is contained in the granules or agglomerates of the casing material.

35. The method according to claim 25, wherein at least a part of the additional component is deposited on the surface of granules or agglomerates of the casing material.

36. The method according to claim 25, wherein at least a part of the additional component is adhered to the surface of the granules or agglomerates of the mineral fiber structure.

37. The method according to claim 25, wherein the additional component is present in the form of solid particles.

38. The method according to claim 26, wherein at least a part of the additional component is deposited on the surface of granules or agglomerates of the casing material.

39. The method according to claim 26, wherein at least a part of the additional component is adhered to the surface of the granules or agglomerates of the mineral fiber structure.

40. The method according to claim 25, wherein the additional component is a binding agent which constitutes from about 0.5 to about 10% by weight of the granules or agglomerates of the mineral fiber structure.

41. The method according to claim 25, wherein the additional component is an alkaline binding agent.

42. The method according to claim 25, wherein the mineral source for the mushrooms is clay.

43. The method according to claim 24, wherein the nutrient source for the mushrooms is lignite.

44. The method according to claim 24, wherein the nutrient source for the mushrooms is selected from the group consisting of sedge based peat, sphagnum based peat and combinations thereof.

45. A casing material for use in the production of mushrooms, the casing material comprising at least 60% by volume of at least one of granules and agglomerates of granules, of a mineral fiber structure selected from the group consisting of slag wool fibers, glass wool fibers, stone wool fibers, naturally occurring mineral fibers, and combinations thereof, the granules or agglomerates of the casing material having a bulk water capacity of at least 300 grams per 100 grams dry weight of the granules or agglomerates, determined at a suction pressure of 10 cm on a calibrated sand bed, and the casing material having a water retaining capacity, determined at a suction pressure of 100 cm on a calibrated sand bed, of at the most 15% by volume of the casing material.

46. The casing material according to claim 45, wherein the casing material, in addition to the granules, or agglomerates of granules, contains at least one additional component distributed in the material, said additional component being selected from the group consisting of nutrient sources for the mushrooms, binding agents, mineral sources for the mushrooms, wetting agents, liming materials, pH adjusting agents, fertilizers, chelating agents, dyes, coloring agents, vitamins, amino acids and combinations thereof.

47. The casing material according to claim 45, wherein the casing material, in addition to the granules, or agglomerates of granules, contains at least one additional component distributed in the material, said additional component being selected from the group consisting of bacteria, fungal mycelia and combinations thereof.

48. The casing material according to claim 45, which contains water in a concentration from about 5 to about 60% based on the dry weight of the ingredients in the material.

49. A casing material for use in the production of mushrooms, the casing material comprising at least one of granules and agglomerates of granules, of a mineral fiber structure selected from the group consisting of slag wool fibers, glass wool fibers, stone wool fibers, naturally occurring mineral fibers, and combinations thereof, and at least one nutrient source for the mushrooms selected from the group consisting of rice chaff, rice flour, casein, casein hydrolysates, peptones, ceratin, gelatin, egg albumin, sedge based peat, sphagnum based peat, lignite and combinations thereof, the granules or agglomerates of the casing material without the nutrient source for the mushrooms having a bulk water capacity of at least 300 grams per 100 grams dry weight of the granules or agglomerates, determined at a suction pressure of 10 cm on a calibrated sand bed, and the casing material comprising at least one nutrient source for the mushrooms and the granules, or agglomerates of granules, having a water retaining capacity, determined at a suction pressure of 100 cm on a calibrated sand bed, of at the most 15% by volume of the casing material.

50. The casing material according to claim 49, wherein the casing material, in addition to the nutrient source for the mushrooms and the granules, or agglomerates of granules, contains at least one additional component distributed in the material, said additional component being selected from the group consisting of binding agents, mineral sources for the mushrooms, wetting agents, liming materials, pH adjusting agents, fertilizers, chelating agents, dyes, coloring agents, vitamins, amino acids and combinations thereof.

51. The casing material according to claim 49, wherein the casing material, in addition to the nutrient source for the mushrooms and the granules, or agglomerates of granules, contains at least one additional component distributed in the material, said additional component being selected from the group consisting of bacteria, fungal mycelia and combinations thereof.

52. The casing material according to claim 49, wherein the nutrient source for the mushrooms is present in an amount from about 5% to about 70% by the dry weight of the casing material.

53. The casing material according to claim 49, which contains water in a concentration from about 5 to about 60% based on the dry weight of the ingredients in the material.

54. The casing material according to claim 49, wherein the nutrient source for the mushrooms is lignite.

55. The casing material according to claim 49, wherein the nutrient source for the mushrooms is selected from the group consisting of sedge based peat, sphagnum based peat and combinations thereof.

* * * * *